US012254854B2

(12) United States Patent
Danjyo

(10) Patent No.: US 12,254,854 B2
(45) Date of Patent: Mar. 18, 2025

(54) ELECTRONIC MUSICAL INSTRUMENT, CONTROL METHOD FOR ELECTRONIC MUSICAL INSTRUMENT, AND STORAGE MEDIUM

(71) Applicant: CASIO COMPUTER CO., LTD., Tokyo (JP)

(72) Inventor: Makoto Danjyo, Iruma (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 699 days.

(21) Appl. No.: 17/611,621

(22) PCT Filed: May 15, 2020

(86) PCT No.: PCT/JP2020/019525
§ 371 (c)(1),
(2) Date: Nov. 16, 2021

(87) PCT Pub. No.: WO2020/235506
PCT Pub. Date: Nov. 26, 2020

(65) Prior Publication Data
US 2022/0238088 A1   Jul. 28, 2022

(30) Foreign Application Priority Data
May 23, 2019   (JP) ................... 2019-096779

(51) Int. Cl.
*G10H 1/00*   (2006.01)
*G10H 1/34*   (2006.01)
*G10H 7/00*   (2006.01)

(52) U.S. Cl.
CPC .......... *G10H 1/0008* (2013.01); *G10H 1/348* (2013.01); *G10H 7/008* (2013.01);
(Continued)

(58) Field of Classification Search
CPC ...... G10H 1/0008; G10H 1/348; G10H 7/008; G10H 2210/095; G10H 2210/375;
(Continued)

(56) References Cited

U.S. PATENT DOCUMENTS 4,241,636 A * 12/1980 Long .................... G10H 1/32
84/DIG. 12
5,747,715 A * 5/1998 Ohta .................... G10H 1/36
84/622

(Continued)

FOREIGN PATENT DOCUMENTS

CN   110634464 A * 12/2019  ........... G10H 1/0008
EP   1274069 A2 * 1/2003  ........... G10H 1/0025
(Continued)

OTHER PUBLICATIONS

Japanese Office Action (and an English language translation thereof) dated Nov. 7, 2023, issued in counterpart Japanese Application No. 2022-146086.
(Continued)

*Primary Examiner* — Christina M Schreiber
(74) *Attorney, Agent, or Firm* — Holtz, Holtz & Volek PC

(57) ABSTRACT

An electronic musical instrument includes a performance operator and at least one processor. In accordance with pitch data associated with the performance operator operated by a user, the at least one processor digitally synthesizes and outputs inferential musical sound data including inferential performance technique of a player. The inferential performance technique of the player is based on acoustic feature data output by a trained acoustic model obtained by performing machine learning on: a training score data set including training pitch data; and a training performance
(Continued)

data set obtained by the player playing a musical instrument and is not played in the user operation of the performance operator.

15 Claims, 19 Drawing Sheets

(52) U.S. Cl.
CPC . *G10H 2210/095* (2013.01); *G10H 2210/375* (2013.01); *G10H 2220/221* (2013.01); *G10H 2220/265* (2013.01); *G10H 2250/311* (2013.01)

(58) Field of Classification Search
CPC ....... G10H 2220/221; G10H 2220/265; G10H 2250/311
USPC ........................................................... 84/609
See application file for complete search history.

(56) References Cited

U.S. PATENT DOCUMENTS

| | | | | |
|---|---|---|---|---|
| 5,880,392 | A  * | 3/1999 | Wessel | G10H 7/10 84/622 |
| 7,034,217 | B2 * | 4/2006 | Pachet | G10H 1/0025 84/645 |
| 2002/0194984 | A1 * | 12/2002 | Pachet | G10H 1/0025 84/609 |
| 2011/0000360 | A1 * | 1/2011 | Saino | G10H 1/361 84/622 |
| 2012/0103167 | A1 * | 5/2012 | Saino | G10H 1/0008 84/622 |
| 2019/0318712 | A1 * | 10/2019 | Nakamura | G10H 1/366 |
| 2019/0392798 | A1 * | 12/2019 | Danjyo | G10H 1/0008 |
| 2019/0392799 | A1 * | 12/2019 | Danjyo | G10H 7/008 |
| 2019/0392807 | A1 * | 12/2019 | Danjyo | G10L 13/033 |
| 2020/0160821 | A1 * | 5/2020 | Maezawa | G06N 3/045 |
| 2021/0012758 | A1 * | 1/2021 | Danjyo | G10H 1/366 |
| 2021/0193114 | A1 * | 6/2021 | Danjyo | G10L 13/08 |
| 2022/0238088 | A1 * | 7/2022 | Danjyo | G10H 1/34 |
| 2023/0005458 | A1 * | 1/2023 | Maezawa | G06N 5/04 |
| 2023/0162712 | A1 * | 5/2023 | Suzuki | G10H 1/0008 84/609 |
| 2024/0021180 | A1 * | 1/2024 | Iwase | G10L 13/0335 |

FOREIGN PATENT DOCUMENTS

| | | | | |
|---|---|---|---|---|
| JP | H0950287 | A |  | 2/1997 |
| JP | 2011013454 | A |  | 1/2011 |
| JP | 2017107228 | A |  | 6/2017 |
| JP | 2019028106 | A |  | 2/2019 |
| JP | 2019219570 | A | * | 12/2019 ............... G10G 3/04 |
| JP | 2020024456 | A | * | 2/2020 |
| WO | WO-2019022118 | A1 | * | 1/2019 ........... G06N 3/0454 |
| WO | WO-2020235506 | A1 | * | 11/2020 ............. G09B 15/00 |

OTHER PUBLICATIONS

"Piano Performance Copy [in consideration of Change of Tempo by Statistical Study besides Yoshiko Teramura]", Information Processing Society of Japan Report-of-Research, Feb. 2010, vol. 2010-MUS-84, No. 12, pp. 1-6.

Extended European Search Report (EESR) dated Jan. 5, 2023, issued in counterpart European Application No. 20809872.3.

Blaauw, et al., "A Neural Parametric Singing Synthesizer Modeling Timbre and Expression from Natural Songs", Applied Sciences, vol. 7, No. 12, Dec. 18, 2017, pp. 1-23.

International Search Report (ISR) (and English language translation thereof) dated Aug. 11, 2020 issued in International Application No. PCT/JP2020/019525.

Written Opinion dated Aug. 11, 2020 issued in International Application No. PCT/JP2020/019525.

Hashimoto, et al., "Statistical parametric speech synthesis based on deep learning," The Journal of the Acoustical Society of Japan, vol. 73, No. 1 (2017), pp. 55-62.

Sako, et al., "A trainable singing voice synthesis system capable of representing personal characteristics and singing styles," IPSJ SIG Technical Report, 2008-MUS-74(7), 2008-SLP-70(7), Feb. 8, 2008, pp. 39-44.

* cited by examiner

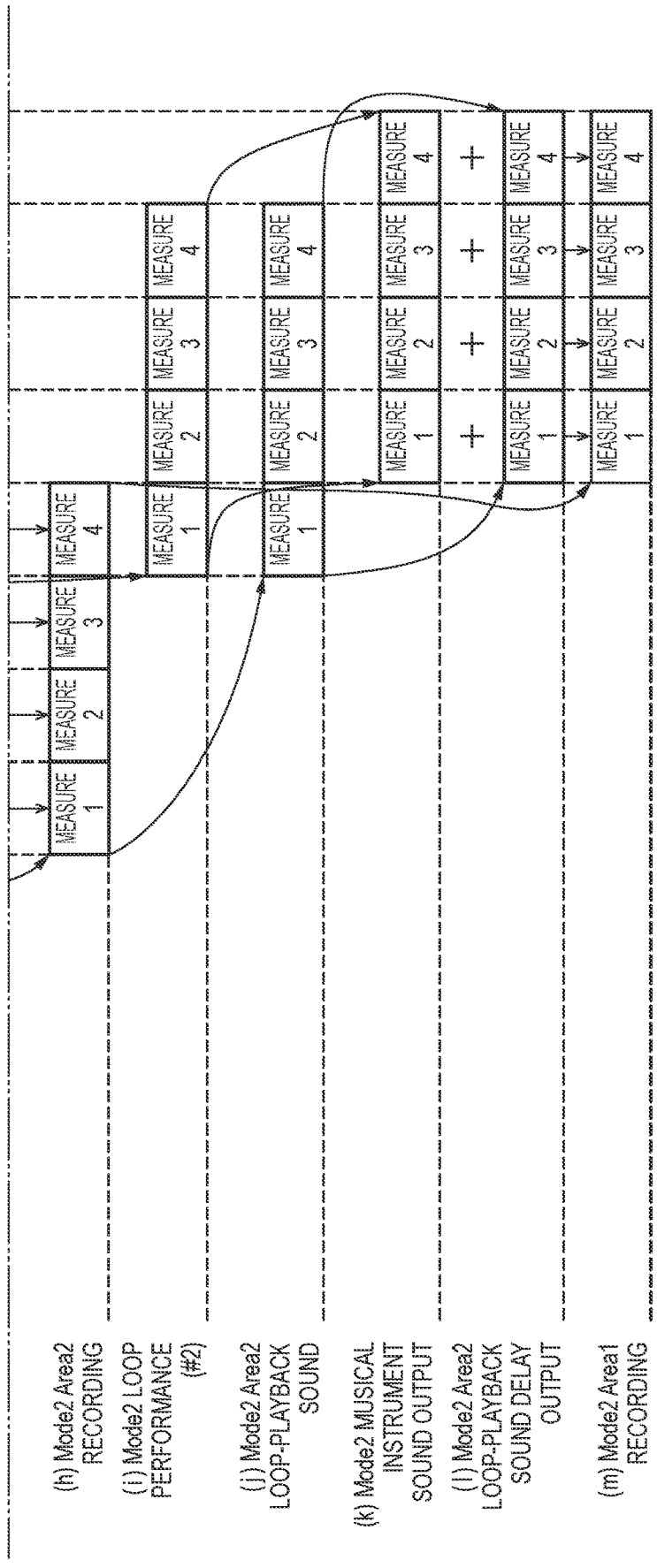

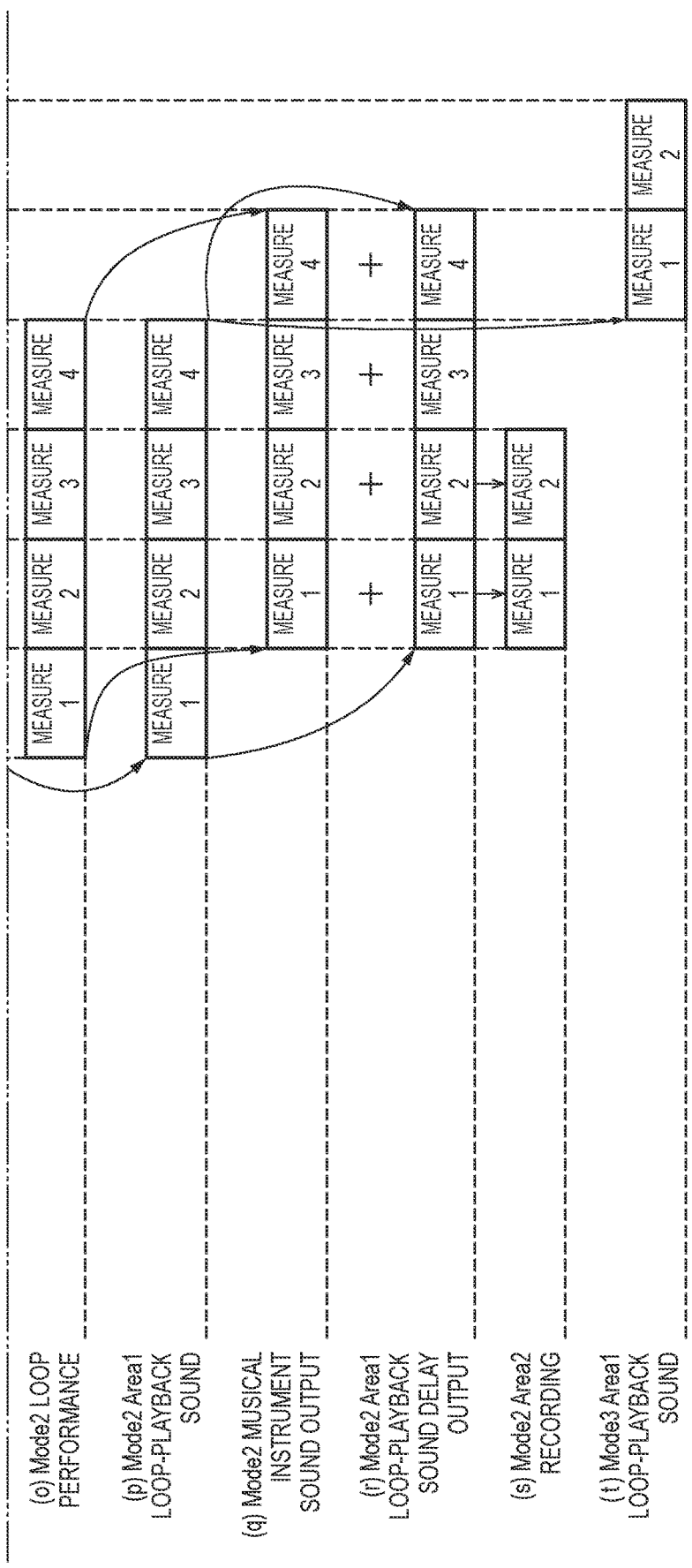

ELECTRONIC MUSICAL INSTRUMENT, CONTROL METHOD FOR ELECTRONIC MUSICAL INSTRUMENT, AND STORAGE MEDIUM

TECHNICAL FIELD

The present invention relates to an electronic musical instrument configured to reproduce a musical instrument sound in response to an operation on an operator such as a keyboard, a control method of an electronic musical instrument, and a storage medium.

BACKGROUND ART

As electronic musical instruments are spread, users can enjoy performances with various musical instrument sounds. For example, even a beginner user can easily enjoy a performance of a piece of music by following and touching light-emitting keys or by following an operation guide of a performance displayed on a display. Pitch, duration, note-on timing, an accent on a beat, and the like of a note played by the user are left to the user's performance skill.

CITATION LIST

Patent Literature

Patent Literature 1: JP-1109-050287A

SUMMARY OF INVENTION

Technical Problem

Particularly in a case in which the user is a beginner, the user manages to follow the pitch of each note in scores when performing phrases of various pieces on a musical instrument. However, it is difficult to reproduce professional player's exquisite performance of note-on timing, duration, an accent on a beat, and the like of each note in a phrase, which are proper to a musical instrument.

Solution to Problem

An electronic musical instrument according to an aspect of the present invention includes:
  a plurality of performance operators each of which is associated with different pitch data;
  a memory storing a trained acoustic model obtained by performing machine learning on:
    a training score data set including training pitch data and
    a training performance data set obtained by a player playing a musical instrument; and
  at least one processor,
  in which the at least one processor:
    in accordance with a user operation on one of the performance operators, inputs pitch data corresponding to the user operation on the one of the performance operators into the trained acoustic model in order to cause the trained acoustic model to output acoustic feature data corresponding to the input pitch data and
    digitally synthesizes and outputs inferential musical sound data including inferential performance technique of the player
    that is based on the acoustic feature data output by the trained acoustic model in accordance with the input pitch data and
    that is not played in the user operation

ADVANTAGEOUS EFFECTS OF INVENTION

By implementing the present invention, it is possible to provide an electronic musical instrument configured to produce a sound as if it were played by a professional player according to user's operation on performance operators.

BRIEF DESCRIPTION OF THE DRAWINGS

FIG. 1.0A is a flowchart showing a detailed example of initialization processing.

DESCRIPTION OF EMBODIMENTS

Hereinafter, embodiments of the present invention will be described in detail with reference to the drawings.

Figure 1:
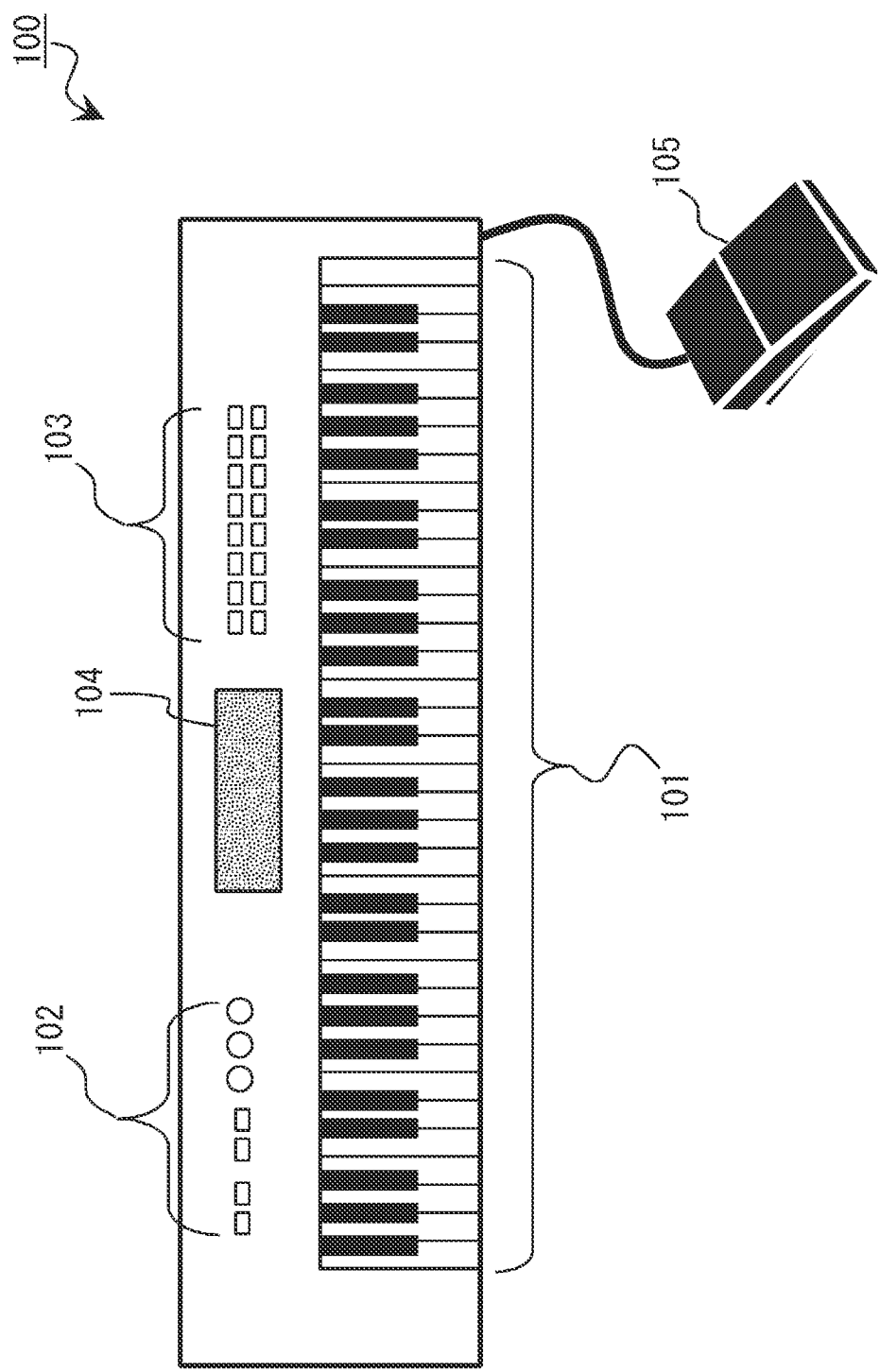
FIG. 1 shows an exterior example of an embodiment of an electronic keyboard instrument.

FIG. 1 shows an exterior example of an embodiment of an electronic keyboard instrument 100. The electronic keyboard instrument 100 includes: a keyboard 101 including a plurality of keys as performance operators (a plurality of performance operators 101); a first switch panel 102 for various settings such as volume control and a tempo setting of loop recording; a second switch panel 103 for selecting a timbre of a sound module of the electronic keyboard instrument 100, a musical instrument whose sound to be synthesized, and the like; a liquid-crystal display (LCD) 104 configured to display various setting data and the like. A foot-operated pedal 105 (pedal operator 105) for loop recording and playback is connected to the electronic keyboard instrument 100 via a cable. In addition, although not particularly shown, the electronic keyboard instrument 100 includes a speaker configured to produce a musical sound generated by a performance provided on a reverse, side, or rear surface or the like.

Figure 2:
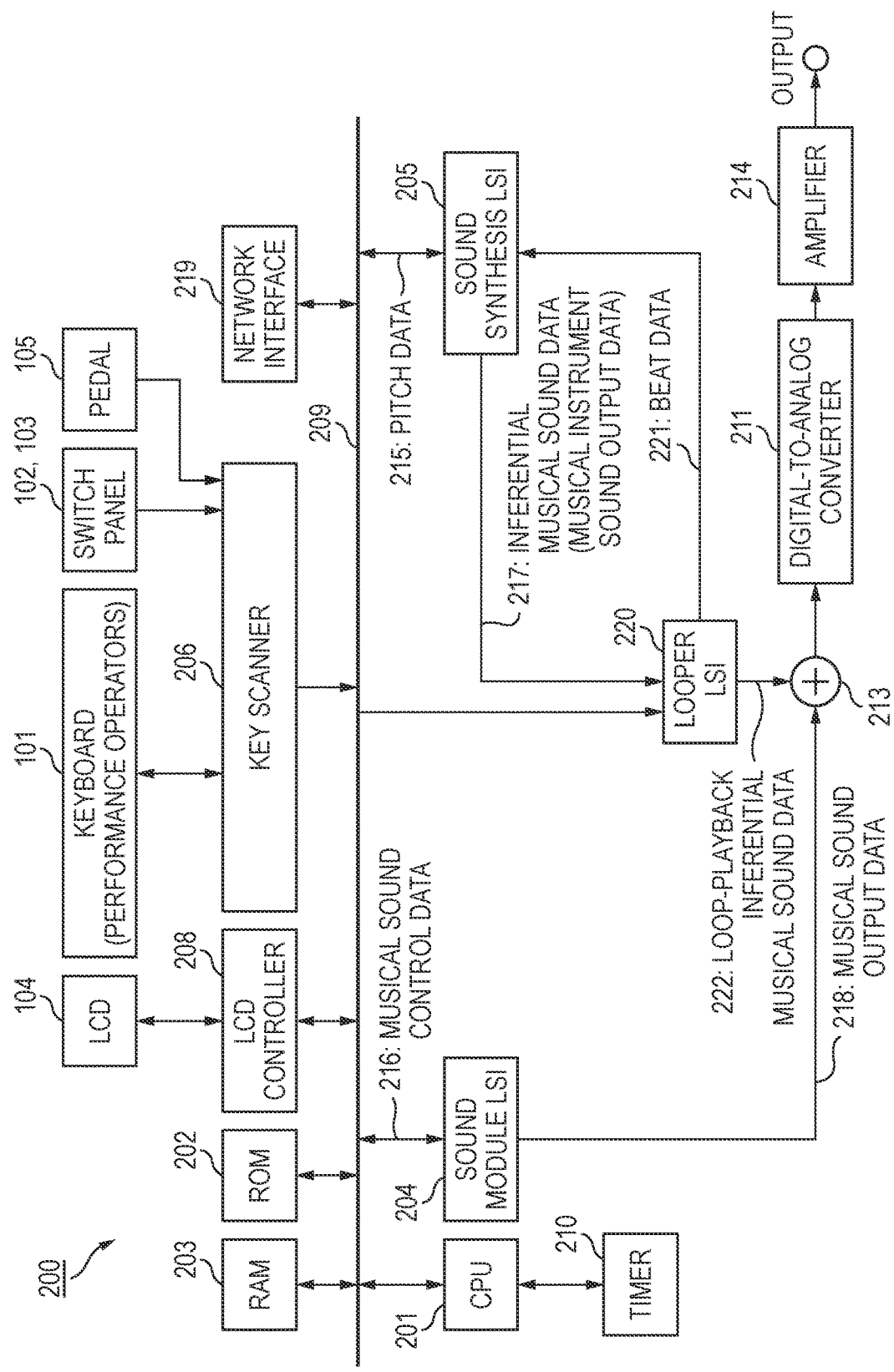
FIG. 2 is a block diagram showing a hardware configuration example of an embodiment of a control system of the electronic keyboard instrument.

FIG. 2 shows a hardware configuration example of an embodiment of a control system 200 of the electronic keyboard instrument 100 of FIG. 1. In the control system 200 of FIG. 2, connected to a system bus 209 are: a central processing unit (CPU) 201; a ROM (read-only memory/large-capacity flash memory) 202; a RAM (random-access memory) 203; a sound module large-scale integration (LSI) 204; a sound synthesis LSI 205 (a processor 205); a looper LSI 220; a key scanner 206 to which the keyboard 101, the first switch panel 102, the second switch panel 103, and the pedal 105 of FIG. 1 are connected; and an LCD controller 208 to which the LCD 104 of FIG. 1 is connected. In addition, a timer 210 for controlling loop recording/playback processing in the looper LSI 220 is connected to the CPU 201. Musical sound output data 218 output from the sound module LSI 204 and loop-playback inferential musical sound data 222 output from the looper LSI 220 are mixed in a mixer 213 and then converted into an analog output signal by a digital-to-analog converter 211. The analog output signal is amplified in an amplifier 214 and then is output from the speaker (not shown) or an output terminal (not shown).

The CPU 201 is configured to execute a control operation of the electronic keyboard instrument 100 of FIG. 1 by executing a control program stored in the ROM 202 with the RAM 203 as a working memory. The ROM 202 stores the control program and various fixed data along with model parameters and the like of a training result of machine learning to be described later.

The timer 210 used in the present embodiment is implemented on the CPU 201 and is, for example, configured to manage progress of loop recording/playback in the electronic keyboard instrument 100.

The sound module LSI 204 is, for example, configured to load the musical sound output data 218 from a waveform ROM (not shown) and output it to the mixer 213 according to sound production control data from the CPU 201. The sound module LSI 204 is capable of generating up to 256 voices at the same time.

The sound synthesis LSI 205 receives data indicating a musical instrument, in advance, and pitch data 215, which is a pitch sequence of each phrase, from the CPU 201. Then, the sound synthesis LSI 205 digitally synthesizes inferential musical sound data 217 of the phrase including a performance expression sound (inferential performance technique of a player) representing a sound corresponding to a performance technique that is not performed by a user such as articulation including a slur, which is a symbol in a Western music score. The sound synthesis LSI 205 is configured to output the inferential musical sound data 217, which is digitally synthesized, to the looper LSI 220.

In response to an operation on the pedal 105 of FIG. 1, the looper LSI 220 loop-records the inferential musical sound data 217 output by the sound synthesis LSI 205 with loop-playback sounds repeatedly played back. The looper LSI 220 repeatedly outputs the loop-playback inferential musical sound data 222 finally obtained to the mixer 213.

In order to convey a state change by interrupting the CPU 201, the key scanner 206 is configured to scan: a key press/release state of the keyboard 101 of FIG. 1; switch states of the first switch panel 102 and the second switch panel 103; and a pedal state of the pedal 105, The LCD controller 208 is an integrated circuit (IC) configured to control a display state of the LCD 104.

Figure 3:
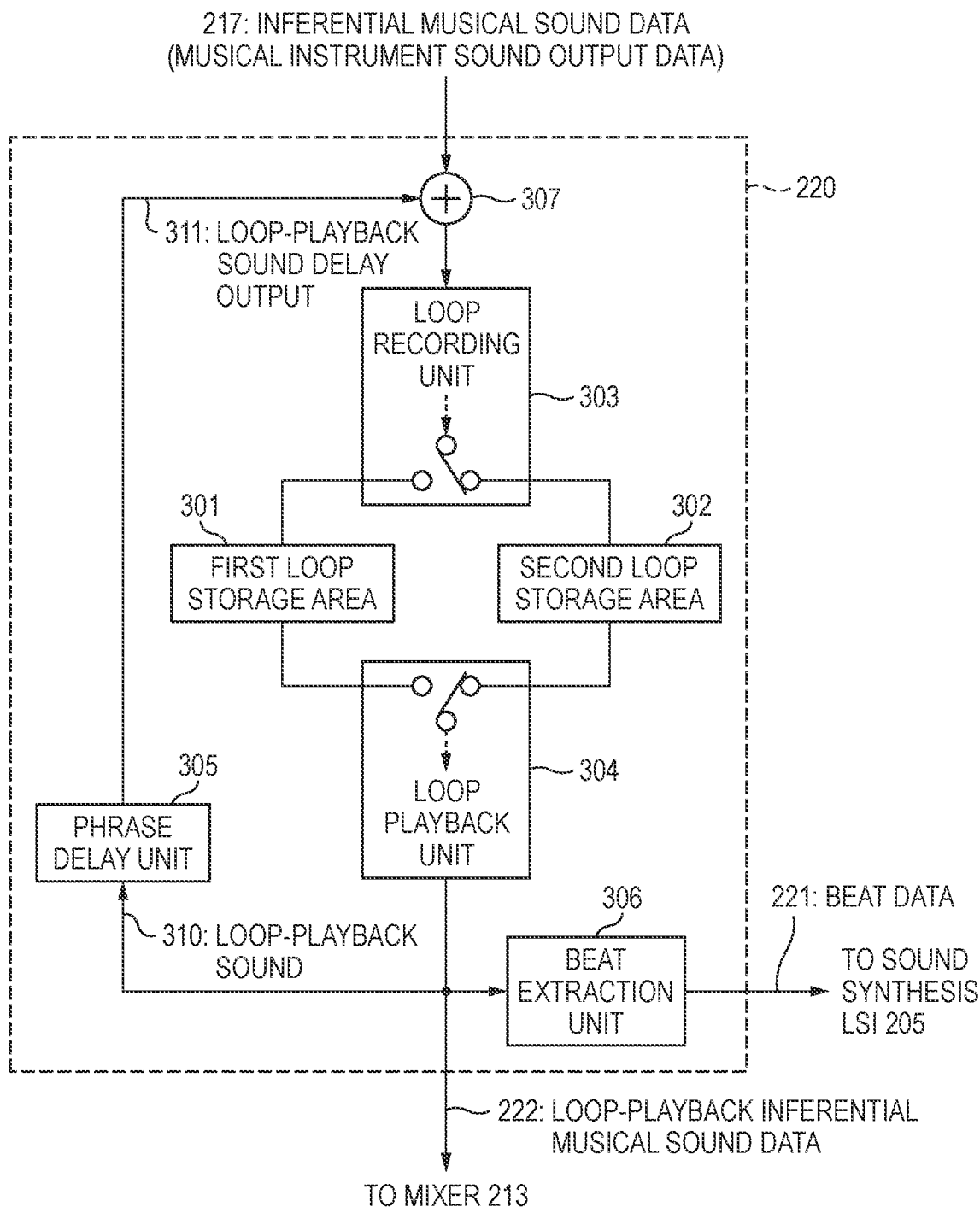
FIG. 3 is a block diagram showing a configuration example of a looper LSI.

FIG. 3 is a block diagram showing a configuration example of the looper LSI 220 of FIG. 2. The looper LSI 220 includes: first and second loop storage areas 301 and 302 for storing the loop-playback inferential musical sound data 222 of a repetition section to be played back repeatedly; a loop recording unit 303 configured to record the inferential musical sound data 217, which is output from the sound synthesis LSI 205, on one of the loop storage areas via the mixer 307; a loop playback unit 304 configured to play back the inferential musical sound data 217 stored in the one of the loop storage areas as a loop-playback sound 310; a phrase delay unit 305 configured to delay the loop-playback sound 310 by one phrase (one measure); a mixer 307 configured to mix a loop-playback sound delay output 311, which is output from the phrase delay unit 305, with the inferential musical sound data 217, which is input from the sound synthesis LSI 205, and output the mixed data to the loop recording unit 303; and a beat extraction unit 306 configured to extract a beat timing from the loop-playback sound 310, which is output from the loop playback unit 304, as beat data 221 and output it to the sound synthesis LSI 205.

In the present embodiment, for example, in the electronic keyboard instrument 100 of FIG. 1, the user sequentially touches keys on the keyboard 101 correspondingly to a pitch sequence of a phrase in a score of a piece, following an automatic rhythm or accompaniment sound generated by known art and output from the sound module LSI 204. Keys to be touched by the user may be guided by light-emitting keys on the keyboard 101 of known art. The user does not have to follow pressing timing or pressing duration of the keys of notes. The user has only to touch the keys following at least the pitch, that is, for example, only to touch keys by following keys with light. Every time the user completes pressing of the keys in a phrase, the CPU 201 of FIG. 2 outputs a pitch sequence of the assembled keys in the phrase obtained by detecting the pressing of the keys to the sound synthesis LSI 205. As a result, with a delay by one phrase, the sound synthesis LSI 205 can generate the inferential musical sound data 217 of the phrase from the pitch sequence of the phrase played simply by the user as if it were played by a professional player of a musical instrument designated by the user.

In an embodiment using the inferential musical sound data 217 output from the sound synthesis LSI 205 in this way, the inferential musical sound data 217 can be used for loop recording/playback processing by the looper LSI 220 of FIG. 2. Specifically, for example, the inferential musical sound data 217 output from the sound synthesis LSI 205 may be input into the looper LSI 220 for loop recording, interferential musical sound data 217 that is additionally produced may be overdubbed on the loop-playback sounds repeatedly played hack, and the loop-playback sound obtained in this way may be used for a performance.

Figure 4:
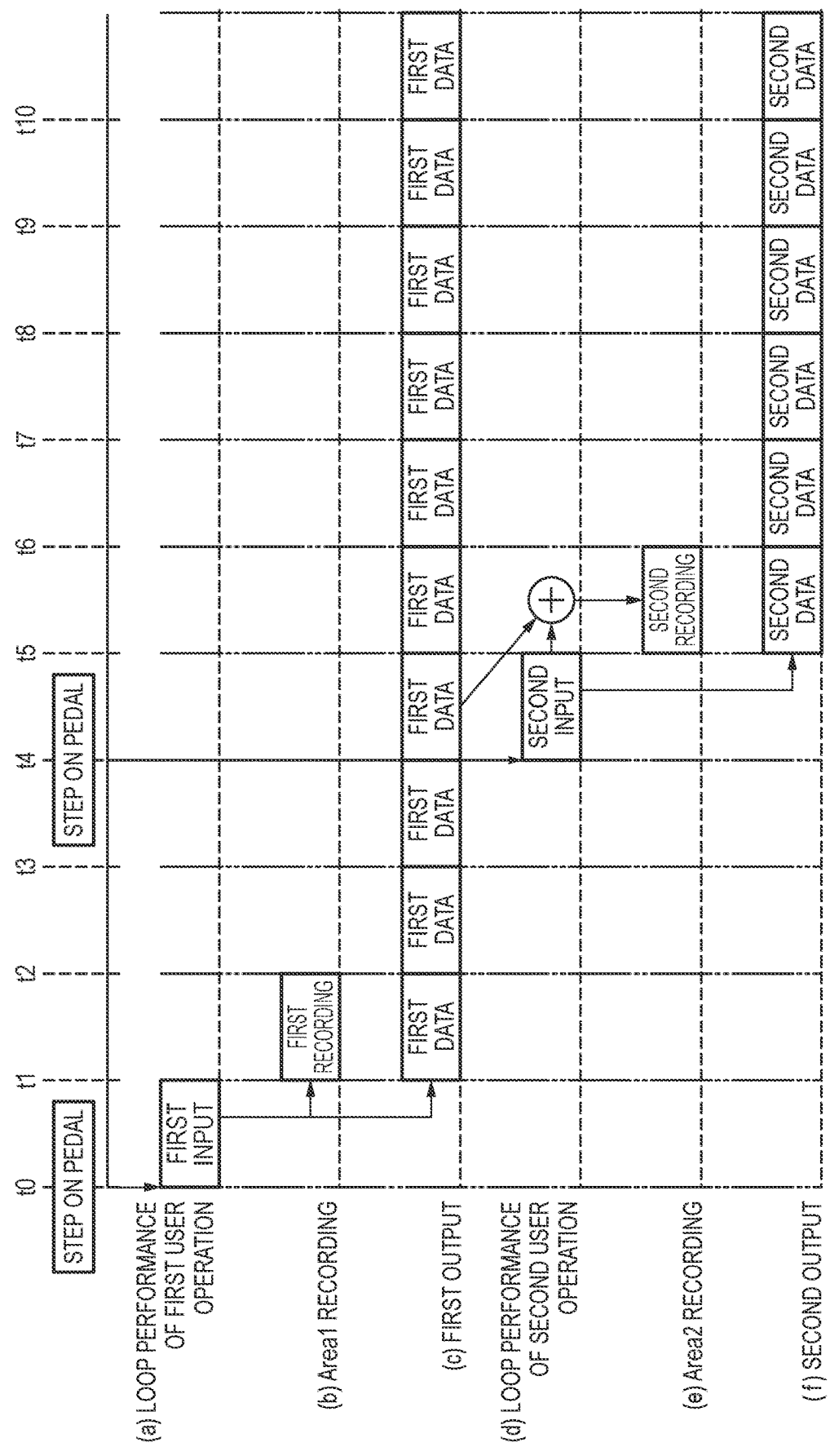
FIG. 4 is a timing chart of a first embodiment of loop recording/playback processing.

FIG. 4 is a timing chart of a first embodiment of the loop recording/playback processing, which is a basic operation of the loop recording/playback processing executed in the looper LSI 220 of FIG. 3. In the first embodiment of the loop recording/playback processing, for easy understanding, an outline operation of a case will be described in which the user executes the loop recording/playback processing with one phrase one measure.

First, when the user steps on the pedal 105 of FIG. 1, the looper LSI 220 performs loop recording/playback processing below. In the loop recording/playback processing, a first user operation (performance) is performed in which the user specifies, with the keyboard 101 of FIG. 10, a pitch sequence of one phrase to be repeatedly played back (loop playback). The pitch sequence includes a plurality of pitches having different timings. For example, in a phrase from time t0 (first timing) to time t1 (second timing) in (a) of FIG. 4, a pitch sequence (hereinafter, referred to as "first phrase data") of the phrase is input from the keyboard 101 via the key scanner 206 and the CPU 201, into the sound synthesis LSI 205 as the pitch data 215 (hereinafter, this input is referred to as "first input").

When the sound synthesis LSI 205 receives data indicating a musical instrument, in advance, and the first input (the pitch data 215 including the pitch sequence of the phrase) from the CPU 201, the sound synthesis LSI 205 synthesizes the inferential musical sound data 217 of the phrase correspondingly and outputs it to the looper LSI 220, for example, from time t1 to time t2 in (b) of FIG. 4. The sound synthesis LSI 205 outputs the inferential musical sound data 217 (hereinafter, referred to as "first phrase inferential musical sound data 217") of the phrase including a performance expression sound representing a sound corresponding to a performance technique that is not performed by the user, based on acoustic feature data 617 output from a trained acoustic model unit 606 to be described later in FIG. 6. The performance technique that is not performed by the user refers to, for example, an articulation performance technique to reproduce a phrase performance (hereinafter, referred to as "a first phrase performance") on a musical instrument by a player including a slur.

In the looper LSI 220 of FIG. 3, from time t1 to time t2 in (b) of FIG. 4, the loop recording unit 303 sequentially records (stores), for example, in the first loop storage area 301 (Area1), the first phrase inferential musical sound data 217 of the phrase output from the sound synthesis LSI 205 based on the first input of the phrase from time t0 to time t1 in (a) of FIG. 4.

In the looper LSI 220 of FIG. 3, for example, the loop playback unit 304 outputs (hereinafter, this output is referred to as "first output") the first phrase inferential musical sound data 217 (first sound data, or "first data" in (c) of FIG. 4) recorded in the first loop storage area 301 (Area1) as the loop-playback sound 310 repeatedly from time t1 to time t2, from time t2 to time t3, from time t4 to time 5, and so on in (c) of FIG. 4. The first output, which is output repeatedly from the looper LSI 220 of FIG. 2 as the loop-playback inferential musical sound data (first sound data) 222, is output from the speaker (not shown) via the mixer 213, the digital-to-analog converter 211, and the amplifier 214.

Next, while playback of the first output is repeated as shown in (c) of FIG. 4, the user steps on the pedal 105 of FIG. 1 again, for example, at a start timing (for example, time t4 in FIG. 4, or third timing) of a phrase. After stepping on the pedal 105, the user performs a second user operation (performance) for specifying a pitch sequence of another phrase for loop playback with the keyboard 101 of FIG. 1. The pitch sequence includes a plurality of pitches having different timings. For example, for a phrase from time t4 (third timing) to time t5 (fourth timing) in (d) of FIG. 4, a pitch sequence (hereinafter, referred to as "second phrase data") of the phrase is input from the keyboard 101 via the key scanner 206 and the CPU 201, into the sound synthesis LSI 205 as the pitch data 215 (hereinafter, this input is referred to as "second input"), When the sound synthesis LSI 205 receives data indicating a musical instrument, in advance, and the second input (the pitch data 215 including the pitch sequence of the phrase) from the CPU 201, the sound synthesis LSI 205 synthesizes the inferential musical sound data (second sound data) 217 of the phrase correspondingly and outputs it to the looper LSI 220, for example, from time t5 to time t6 in (e) of FIG. 4. Like the first phrase inferential musical sound data 217, the sound synthesis LSI 205 outputs inferential musical sound data 217 (hereinafter, referred to as "second phrase inferential musical sound data 217") of the phrase including a performance expression sound representing a sound corresponding to a performance technique that is not performed by the user, based on the acoustic feature data 617 output from the trained acoustic model unit 606 to be described later in FIG. 6. The performance technique that is not performed by the user refers to, for example, an articulation performance technique to reproduce another phrase performance (hereinafter, referred to as "second phrase performance") on the musical instrument by the player including a slur.

In other words, based on the acoustic feature data 617 output from the trained acoustic model unit 606, the processor 201 of the electronic musical instrument 100 is configured to output the musical sounds 217 to which effects corresponding to various kinds of performance technique are applied even without detecting the user performance operation corresponding to performance technique.

In the looper LSI 220 of FIG. 3, from time t5 to time t6 in (e) of FIG. 4, the mixer 307 mixes the second phrase inferential musical sound data 217 of the phrase, which is output from the sound synthesis LSI 205 according to the second phrase input from time t4 to time t5 in (d) Of FIG. 4, with the first output of the first phrase inferential musical sound data from time t4 to time t5 in (c) of FIG. 4, which is the loop-playback sound 310 input into the mixer 307 as the loop-playback sound delay output 311 via the phrase delay unit 305 from the loop playback unit 304. Then, from time t5 to time t6 in (e) of FIG. 4, the loop recording unit 303 sequentially records (stores) the first output and the second output superimposed as described above, for example, in the second loop storage area 302 (Area1).

In the looper LSI 220 of FIG. 3, the loop playback unit 304 outputs (hereinafter, this output is referred to as "second output") the second phrase inferential musical sound data (second sound data) 217 superimposed over the first phrase inferential musical sound data (first sound data) 217 recorded in the second loop storage area 302 (Area2) as the loop-playback sound 310, for example, from time t5 to time t6, from time t6 to time t7, from time t7 to time t8, and so on in (f) of FIG. 4. Repeated sound sequence output from the looper LSI 220 of FIG. 2 in which the first output and the second output are superimposed is output from the speaker (not shown) as the loop-playback inferential musical sound data 222 via the mixer 213, the digital-to-analog converter 211, the amplifier 214.

If loop recording of a phrase is to be further superimposed, similar processing may be performed for a new first input, which used to be the second input, and new second input.

In this way, according to the first embodiment of the loop recording/reproduction processing by the looper LSI 220, simply by the user inputting a phrase to specify the pitch sequence as the first phrase data and additionally as the second phrase data with the second phrase data superimposed over the first phrase data, the first and second phrase data can be converted into each inferential musical sound data 217 to reproduce a phrase performance on a musical instrument by a player using the sound synthesis LSI 205. Thus, the loop phrase sound sequence including a performance expression representing a sound corresponding to a performance technique that is not performed by the user such as articulation including a slur can be output as the loop-playback inferential musical sound data 222.

In the embodiment of the loop recording/playback processing, when the first phrase inferential musical sound data (first sound data) 217 and the second phrase inferential musical sound data (second sound data) 217 are superimposed, a beat of each superimposed phrase can be out of sync. Therefore, in the looper LSI 220 according to the present embodiment shown in FIG. 3, the beat extraction unit 306 is configured to extract beat timing from the loop-playback sound 310 output from the loop playback unit 304 as the beat data 221 to output the beat data 221 to the sound synthesis LSI 205, thereby quantization processing being performed.

Figure 5:
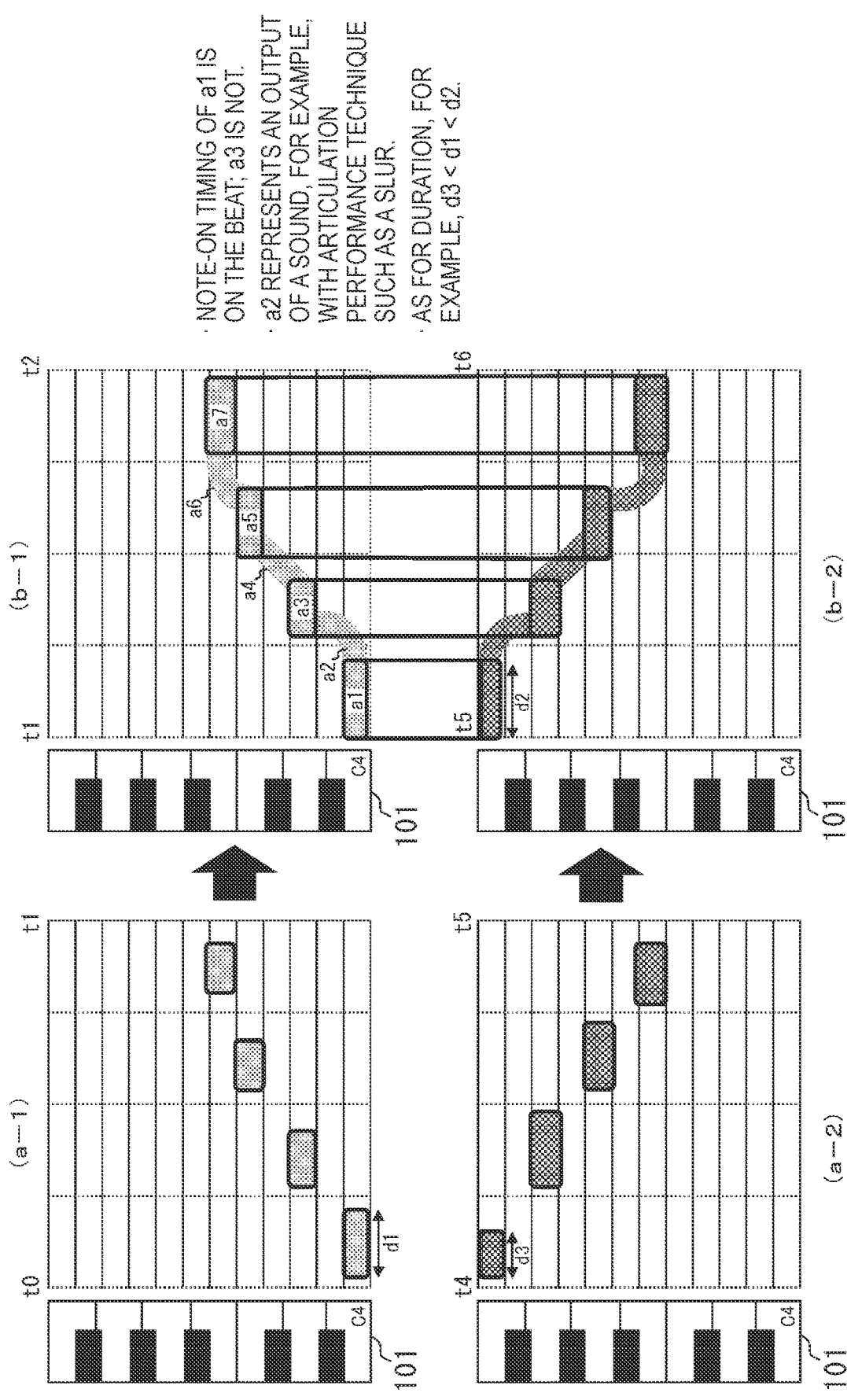
FIG. 5 illustrates quantization processing.

FIG. 5 illustrates the quantization processing. In (a-1) of FIG. 5, four filled blocks in a phrase from time t0 to time t1 represent the first phrase data ("first input" in (a) of FIG. 4), that is, a pitch sequence of four notes each of whose key-press timings in the phrase from time t0 to time t1 by the user is schematically shown with a corresponding key in keyboard 101 in (a) of FIG. 4. Beat timing is shown as four vertical broken lines in FIG. 4. On the other hand, shown in (b-1) in FIG. 5 is the first phrase inferential musical sound data (first sound data) output from the sound synthesis LSI 205 by inputting the first phrase data into the sound synthesis LSI 205 as the pitch data 215. A1, a3, a5, and a7 correspond to notes played in the beats, and a2, a4 and a6 schematically show slurred notes, which are not in the original user performance.

Given that performance technique of a player is reproduced, note-on timing of a1, a5, and a7 does not always coincide with each beat.

In (a-2) of FIG. 5, four filled blocks in a phrase from time t4 to time t5 represent the second phrase data ("second input" in (d) of FIG. 4), that is, a pitch sequence of four notes each of whose key-press timing in the phrase from time t4 to time t5 by the user is schematically shown with a corresponding key in keyboard 101 in (d) of FIG. 4. Beat timing is shown as four vertical broken lines in FIG. 4. When the second phrase inferential musical sound data 217 produced by inputting the second phrase data into the sound synthesis LSI 205 is superimposed over the first phrase inferential musical sound data 217 in the loop recording/playback processing described in FIG. 4, beats of the two inferential musical sound data 217 can be out of sync since the two pitch sequences are not identical to each other usually.

Figure 6:
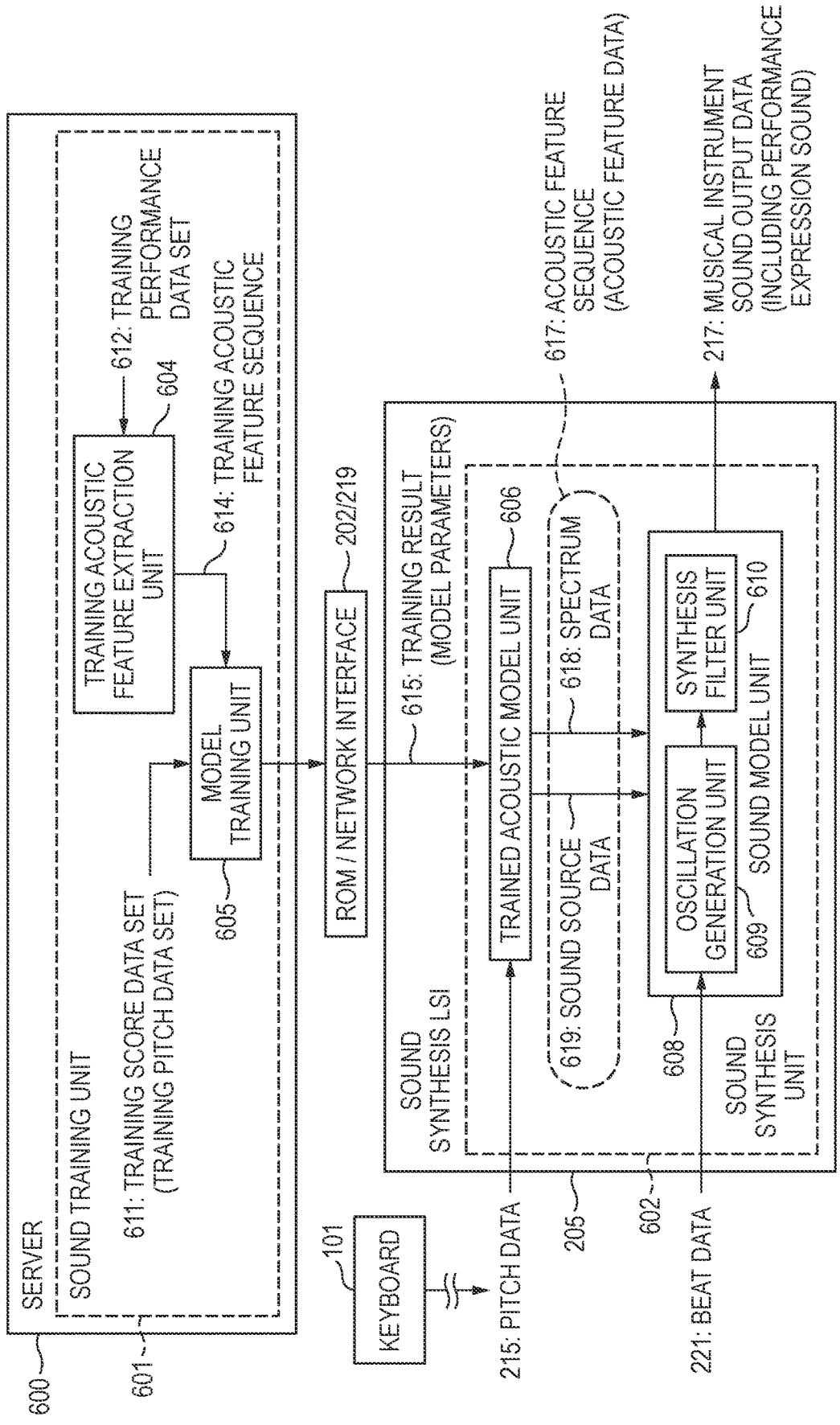
FIG. 6 is a block diagram showing a configuration example of a sound training unit and a sound synthesis unit.

Therefore, in the looper LSI 220 according to the present embodiment shown in FIG. 3, the beat extraction unit 306 is configured to extract beat timing from the loop-playback sound 310 generated from the first phrase inferential musical sound data 217 in (b-1) of FIG. 5 with note-on timing of a1; a3, a5, and a7 in (b-1) of FIG. 5 the beat data 221. This extraction can be implemented, for example, by detecting four peaks in power of a waveform of the loop-playback sound 310. The beat data 221 represents beats in the phrase extracted from the loop-playback sound 310 and is input into an oscillation generation unit 609 in a sound model unit 608 in the sound synthesis LSI 205 of FIG. 6 to be described later. In FIG. 6 to be described later, the oscillation generation unit 609 performs so-called quantization processing in which each pulse is adjusted according to the beat data 221, when, for example, generating a pulse sequence periodically repeated at a basic frequency (F0) that is included in sound source data 619.

Under such control, the sound model unit 608 in the sound synthesis LSI 205 of FIG. 6 to be described later generates the second phrase inferential musical sound data 217 during the phrase from time t5 to time t6 in (e) of FIG. 4, so that the note-on timing of notes in the beats of the second phrase inferential musical sound data 217 can synchronize with that of a1, a3, a5, and a7 of the first phrase inferential musical sound data 217, as shown in (b-1) and (b-2) of FIG. 5, Thus, the inferential musical sound data 217 output from the sound model unit 608 of FIG. 6 to be described later can synchronize with the loop-playback sound 310 already generated in the looper LSI 220, thereby the loop-playback sound 310 being less incongruous even when overdubbed.

That is, the processor 205 generates the second sound data by synchronizing the note-on timing of first notes in the first sound data, which does not always coincide with the beats, with that of second notes in the second phrase data, or by matching the duration of the first notes in the first sound data with that of the second notes in the second phrase data.

FIG. 6 is a block diagram showing a configuration example of a sound synthesis unit 602 and a sound training unit 601 in the present embodiment. The sound synthesis unit 602 is built into the electronic keyboard instrument 100 as a function performed by the sound synthesis LSI 205 of FIG. 2.

Every phrase (measure) recognized based on a tempo setting to be described later, the sound synthesis unit 602 synthesizes and outputs the inferential musical sound data 217 by receiving the pitch data 215 including the pitch sequence instructed from the CPU 201 via the key scanner 206 of FIG. 2 according to key touching in the keyboard 101 of FIG. 1. The processor of the sound synthesis unit 602 inputs the pitch data 215, which includes the pitch sequence of a phrase associated with the keys, into a trained acoustic model of a musical instrument selected by the user in the trained acoustic model unit 606 in response to an operation on the keys (operators) in the keyboard 101. The processor of the sound synthesis unit 602 performs processing of outputting the inferential musical sound data 217, which reproduces the musical instrument performance sound of a phrase, based on spectrum data 618 and sound source data 619 that are output by the trained acoustic model unit 606 according to the input.

For example, as shown in FIG. 6, the sound training unit 601 may be implemented as a function performed by a server 600 provided outside the electronic keyboard instrument 100 of FIG. 1. Alternatively, although not shown in FIG. 6, the sound training unit 601 may be built into the electronic keyboard instrument 100 as a function performed by the sound synthesis LSI 205 if the sound synthesis LSI 205 of FIG. 2 has spare processing capacity.

The sound training unit 601 and the sound synthesis unit 602 of FIG. 2 are implemented based on, for example, Non-patent Literature 1 "Statistical Parametric Speech Synthesis Based on Deep Learning," cited below.

Non-patent Literature 1: Kei Hashimoto and Shinji Takaki, "Statistical Parametric Speech Synthesis Based on Deep Learning," Journal of the Acoustical Society of Japan, Vol. 73, No. 1 (2017), pp. 55-62.

As shown in FIG. 6, the sound training unit 601 of FIG. 2 that is, for example, a function performed by the server 600 outside includes a training acoustic feature extraction unit 604 and a model training unit 605.

In the sound training unit 601, for example, a recording of sounds obtained by performing pieces of music of a genre on a musical instrument is used as a training performance data set 612, and text data of pitch sequences of phrases of pieces of music is used as a training score data set 611, which is a training pitch data set.

The training acoustic feature extraction unit 604 is configured to load and analyze the training performance data set 612 recorded through a microphone or the like by, for example, a professional player playing a pitch sequence of a phrase included in the training score data set 611 on a musical instrument, loading the text data of the pitch sequence of the phrase included in the training score data set 611. Then the training acoustic feature extraction unit 604 extracts and outputs a training acoustic feature sequence 614 representing features of sounds in the training performance data set 612.

The model training unit 605 is configured to estimate, using machine learning, an acoustic model such that a conditional probability of the training acoustic feature sequence 614 given the training score data set 611 and the acoustic model is maximized according to Eq. (1) below as described in Non-patent Literature 1. In other words, a relationship between a musical instrument sound feature sequence, which is text data, and an acoustic feature sequence, which is sounds, is expressed using a statistical model called an acoustic model.

[Math 1]

$$\hat{\lambda} = \underset{\lambda}{\operatorname{argmax}} P(o \mid l, \lambda) \quad (1)$$

In Eq. (1), the arg max refers to an operation returning an argument written underneath it such that a value of a function written on the right is maximized.

The following symbol denotes a training score data set 611.

$$l \quad \text{[Math 2]}$$

The following symbol denotes an acoustic model.

$$\lambda \quad \text{[Math 3]}$$

The following symbol denotes a training acoustic feature sequence 614.

$$o \quad \text{[Math 4]}$$

The following symbols denote a probability that the training acoustic feature sequence 614 will be generated.

$$P(o \mid l, \lambda) \quad \text{[Math 5]}$$

The following symbol denotes the acoustic model such that the probability that the training acoustic feature sequence 614 will be generated is maximized.

$$\hat{\lambda} \quad \text{[Math 6]}$$

The model training unit 605 is configured to output, as a training result 615, model parameters that represents an acoustic model calculated using the machine learning according to Eq. (1).

For example, as shown in FIG. 6, the learning result 615 (model parameters) is stored in the ROM 202 of the control system shown in FIG. 2 of the electronic keyboard instrument 100 before shipment of the electronic keyboard instrument 100 of FIG. 1. The training result 615 may be loaded from the ROM 202 of FIG. 2 into the trained acoustic model unit 606 to be described later in the sound synthesis LSI 205 when the electronic keyboard instrument 100 is turned on. Alternatively, for example, as shown in FIG. 6, the training result 615 may be downloaded from the Internet (not shown) or a network using universal serial bus (USB) cables or the like via a network interface 219 into the trained acoustic model unit 606 to be described later in the sound synthesis LSI 205 in response to a user operation on the second switch panel 103 of the electronic keyboard instrument 100.

The sound synthesis unit 602, which is a function performed by the sound synthesis LSI 205, includes a trained acoustic model unit 606 and a sound model unit 608. The sound synthesis unit 602 is configured to perform statistical sound synthesis processing in which the inferential musical sound data 217 corresponding to the pitch data 215 including text data of pitch sequence of a phrase by making a prediction using the statistical model called the acoustic model in the trained acoustic model unit 606.

The trained acoustic model unit 606 receives the pitch data 215 of the phrase and outputs the acoustic feature sequence 617 predicted correspondingly. In other words, the trained acoustic model unit 606 is configured to estimate an estimation value of the acoustic feature sequence 617 such that a conditional probability of the acoustic feature sequence 617, which is acoustic feature data, given the pitch data 215, which is input from the keyboard 101 via the key scanner 206 and the CPU 201, and the acoustic model, which is set as the learning result 615 using the machine learning in the model training unit 605 is maximized, according to Eq. (2) below as described in Non-patent Literature 1.

[Math 7]

$$\hat{o} = \underset{o}{\operatorname{argmax}} P(o \mid l, \hat{\lambda}) \quad (2)$$

In Eq. (2), the following symbol denotes pitch data 215 input from the keyboard 101 via the key scanner 206 and the CPU 201.

[Math 8]

$$l \quad (2\text{-}1)$$

The following symbol denotes an acoustic model set as the learning result 615 using the machine learning in the model training unit 605.

[Math 9]

$$\hat{\lambda} \quad (2\text{-}2)$$

The following symbol denotes the acoustic feature sequence 617, which is acoustic feature data.

[Math 10]

$$\hat{o} \quad (2\text{-}3)$$

The following symbol denotes a probability that the acoustic feature sequence 617, which is acoustic feature data, will be generated.

[Math 11]

$$P(o \mid l, \hat{\lambda}) \quad (2\text{-}4)$$

The following symbol denotes an estimation value of the acoustic feature sequence 617 such that the probability that the acoustic feature sequence 617, which is the acoustic feature data, will be generated is maximized.

[Math 12]

$$\hat{o} \qquad (2\text{-}5)$$

The sound model unit 608 receives the acoustic feature sequence 617 and generates the inferential musical sound data 217 corresponding to the pitch data 215 including a pitch sequence designated by the CPU 201. The inferential musical sound data 217 is input into the looper 220 of FIG. 2.

The acoustic features represented by the training acoustic feature sequence 614 and the acoustic feature sequence 617 include spectral data that models a mechanism of sound production or resonance of a musical instrument and sound source data that models a oscillation mechanism of the musical instrument. As the spectral data (spectral parameters), mel-frequency cepstrum, line spectral pairs (LSP), or the like may be adopted. As the sound source data, a fundamental frequency (F0) representing a frequency of a pitch of a musical instrument sound and power may be adopted. The sound model unit 608 includes a oscillation generation unit 609 and a synthesis filter unit 610. The oscillation generation unit 609 models the oscillation mechanism of a musical instrument. The oscillation generation unit 609 sequentially receives a sequence of the sound source data 619 output from the trained acoustic model unit 606 and generates a sound signal, for example, constituted of a pulse sequence periodically repeated with the fundamental frequency (F0) and the power included in the sound source data 619 (in case of a voiced sound note), white noise with the power included in the sound source data 619 (in case of a unvoiced sound note), or a mixture thereof. The synthesis filter unit 610 models the mechanism of sound production or resonance of a musical instrument. The synthesis filter unit 610 sequentially receives a sequence of the spectrum data 618 output from the trained acoustic model unit 606 and forms a digital filter to model the mechanism of the sound production or the resonance of the musical instrument. Then, the synthesis filter unit 610 generates and outputs the inferential musical sound data 217, which is a digital signal, with the sound signal input from the oscillation generation unit 609 as an oscillator signal.

A sampling rate for the training performance data set 612 is, for example, 16 kHz. If mel-frequency parameters Obtainable with mel-frequency cepstral analysis processing are adopted as the spectral parameters included in the training acoustic feature sequence 614 and the acoustic feature sequence 617, 1st to 24th MFCCs obtained, for example, with 5 msec of a frame shift, 25 msec of a flame size, and Blackman window as a window function are used.

The inferential musical sound data 321 output from the sound synthesis unit 602 is input into the looper 220 of FIG. 2.

Next, a first embodiment of the statistical sound synthesis processing by the sound training unit 601 and the sound synthesis unit 602 of FIG. 6 will be described. In the first embodiment of the statistical sound synthesis processing, a hidden Markov model (HMM) described in Non-patent Literature 1 and Non-patent Literature 2, cited below, is used as the acoustic model represented by the training result 615 (model parameters) set in the trained acoustic model 606.

Non-patent Literature 2: Shinji Sako, Keijiro Saino, Yoshihiko Nankaku, Keiichi Tokuda, and Tadashi Kitamura, "A trainable singing voice synthesis system capable of representing personal characteristics and singing styles," Information Processing Society of Japan (IPSJ) Technical Report, Music and Computer (MUS), Vol. 2008, No. 12 (2008), pp. 39-44.

In the first embodiment of the statistical sound synthesis processing, when a musical instrument sound is given with a pitch sequence of one phrase by user's performance, the HMM acoustic model is trained on how the sound source of the musical instrument and the feature parameters of the musical instrument sound of sound production or resonance characteristic change over time. More specifically, the HMM acoustic model models a spectrum, a fundamental frequency (pitch), and temporal structure thereof obtained from the training musical instrument data (the training score data set 611 of FIG. 6) on a note sound (a sound played for a note in a score) basis.

First, processing by the sound training unit 601 of FIG. 6 using the HMM model will be described. The model training unit 605 in the sound training unit 601 trains an HMM acoustic model with the maximum likelihood based on Eq. (1) by inputting the training score data set 611 and the training acoustic feature sequence 614 output from the training acoustic feature extraction unit 604. As described in Non-patent Literature 1, the likelihood function of the HMM acoustic model is expressed by Eq. (3) below.

[Math 13]

$$P(o \mid l, \lambda) = \sum_q P(o \mid q, \lambda) P(q \mid l, \lambda) \qquad (3)$$
$$= \sum_q \prod_{t=1}^T P(o_t \mid q_t, \lambda) P(q_t \mid q_{t-1}, l, \lambda)$$
$$= \sum_q \prod_{t=1}^T \mathcal{N}\!\left(o_t \mid \mu_{q_t}, \Sigma_{q_t}\right) a_{q_{t-1} q_t}$$

In Eq. (3), the following symbol denotes acoustic features in a frame t.

$$o_t \qquad \text{[Math 14]}$$

T denotes the number of frames.

The following symbol denotes a state sequence of the HMM acoustic model.

$$q = (q_1, \ldots, q_T) \qquad \text{[Math 15]}$$

The following symbol denotes a state number of the HMM acoustic model in the frame t.

$$q_t \qquad \text{[Math 16]}$$

The following symbol denotes a state transition probability from a state $q_{t-1}$ to a state $q_t$.

$$a_{q_{t-1} q_t} \qquad \text{[Math 17]}$$

The following symbol is a normal distribution with a mean vector $\mu_{q_t}$ and a covariance matrix $\Sigma_{q_t}$ and represents an output probability distribution for a state $q_t$. Note that, t in $\mu_{q_t}$ and $\Sigma_{q_t}$ is a subscript of q.

$$\mathcal{N}(o_t \mid \mu_{q_t}, \Sigma_{q_t}) \qquad \text{[Math 18]}$$

An expectation-maximization (EM) algorithm is used to train the HMM acoustic model based on maximum likelihood criterion efficiently.

The spectrum data of the musical instrument sound can be modeled using a continuous HMM. However, because the logarithmic fundamental frequency (F0) is a variable dimension time series signal that takes a continuous value in a voiced segment (a segment in which pitch exists) of a musical instrument sound and takes no value in an unvoiced segment (a segment in which pitch does not exist such as a respiratory sound), it cannot be directly modeled using an ordinary continuous or discrete HMM. Therefore, a multi-space probability distribution HMM (MSD-HMM), which is an HMM based on a multi-space probability distribution compatible with the variable dimension, is used to model the mel-frequency cepstrum (spectrum parameters) as a multi-variate Gaussian distribution, and a voiced sound of a musical instrument sound having a logarithmic fundamental frequency (F0) as a Gaussian distribution in a one-dimensional space, and the unvoiced sound of the musical instrument sound as a Gaussian distribution in a zero-dimensional space simultaneously.

The acoustic features (pitch, duration, start/end timing, an accent on a beat, and the like) of a note sound constituting a musical instrument sound are known to vary due to influence by various factors, even if the note (for example, pitch of the note) is the same. Such factors that affect the acoustic features of a note sound are referred to as a context. In the statistical sound synthesis processing of the first embodiment, in order to model the acoustic features of a note sound of a musical instrument accurately, an HMM acoustic model (context-dependent model) that takes a context into consideration can be used, Specifically, the training score data set 611 may take into consideration not only pitch of a note sound but also pitch sequence of notes in a phrase, the musical instrument, and the like. In the model training unit 605, context clustering based on a decision tree may be used for effective handling of combination of contexts. In this clustering, a set of HUM acoustic models are divided into a tree structure using a binary tree, so that HMM acoustic models with similar contexts are grouped into a cluster. Each node in the tree has a question for dividing contexts into two groups such as "Pitch of the previous note sound is x?," "Pitch of the next note sound is y?," and "The musical instrument is z?" Each leaf node has the training result 615 (model parameters) corresponding to a specific HMM acoustic model. For any combination of contexts, by traversing the tree in accordance with the questions at the nodes, one of the leaf nodes can be reached, so that a training result 615 (model parameters) corresponding to the leaf node can be selected. By selecting an appropriate decision tree structure, it is possible to estimate an HMM acoustic model (context-dependent model) with high accuracy and high generalization capability.

Figure 7:
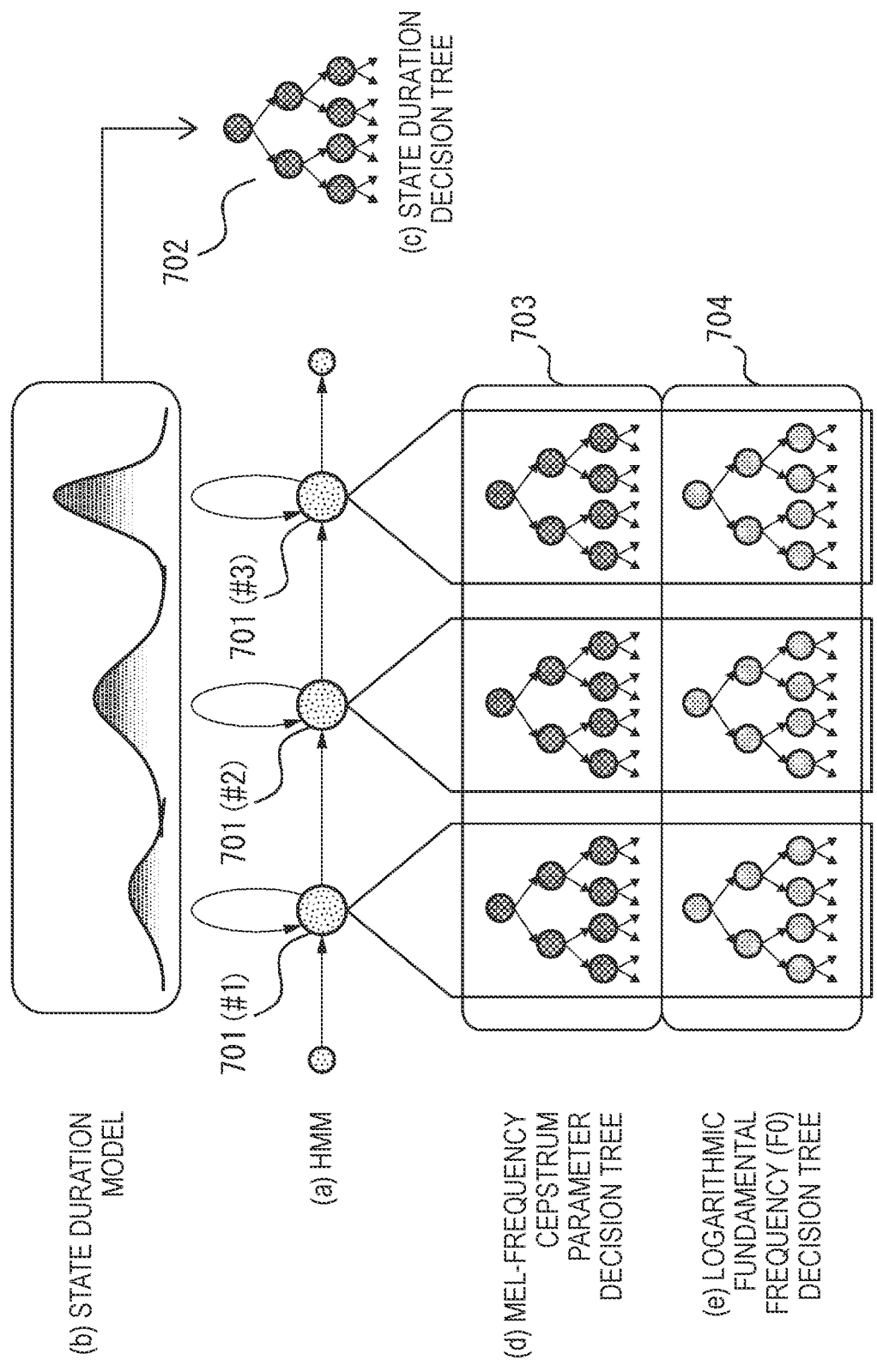
FIG. 7 illustrates a first embodiment of statistical sound synthesis processing.

FIG. 7 is a diagram for explaining an HMM decision tree in the first embodiment of the statistical sound synthesis processing. For each note sound dependent on context, a state of the note sound is, for example, associated with an HMM consisting of three states 701 of #1, #2, and #3 shown in (a) of FIG. 7. An incoming or outgoing arrow for each state represents a state transition. For example, the state 701 (#1) models note-on of a note sound, the state 701 (#2) the middle of the note sound, the state 701 (#3) note-off of the note sound.

Depending on duration of the note sound, duration of each state 701 (#1) to (#3) shown by the HMM in (a) of FIG. 7 is determined using a state duration model in (b) of FIG. 7. The model training unit 605 of FIG. 6 generates a state duration decision tree 702 for determining state duration by learning from the training score data set 611 of FIG. 6, which corresponds to context for a large number of note sound sequences on a phrase basis, and sets it, as the training result 615, in the trained acoustic model unit 606 in the sound synthesis unit 602.

In addition, the model training unit 605 of FIG. 6 generates a mel-frequency cepstrum parameter decision tree 703 for determining mel-cepstrum parameters by learning from the training acoustic feature sequence 614 that corresponds to a large number of note sound sequences on a phrase basis concerning the mel-frequency cepstrum parameters and is extracted, for example, from the training performance data set 612 of FIG. 6 by the training acoustic feature extraction unit 604 of FIG. 6. Then the model training unit 605 sets the mel-frequency cepstrum parameter decision tree 703 generated, as the training result 615, in the trained acoustic model unit 606 in the sound synthesis unit 602.

Further, the model training unit 605 of FIG. 6 generates a logarithmic fundamental frequency decision tree 704 for determining a logarithmic fundamental frequency (F0) by learning from the training acoustic feature sequence 614 that corresponds to a large number of note sound sequences on a phrase basis concerning the logarithmic fundaments frequency (F0) and is extracted, for example, from training performance data set 612 of FIG. 6 by the training acoustic feature extraction unit 604 of FIG. 6. Then the model training unit 605 sets the logarithmic fundamental frequency decision tree 704 generated, as the training result 615, in the trained acoustic model unit 606 in the sound synthesis unit 602. Note that, as described above, a voiced segment with the logarithmic fundamental frequency (F0) is modeled as a Gaussian distribution in a one-dimensional space, and an unvoiced segment as a Gaussian distribution in zero-dimensional space by the MSD-HMM compatible with a variable dimension. In this way, the logarithmic fundamental frequency decision tree 704 is generated.

Although not shown in FIG. 7, the model training unit 605 of FIG. 6 may be configured to generate a decision tree for determining context concerning an accent (for example, an accent on a beat) or the like of a note sound by learning from the training score data set 611, which corresponds to context for a large number of note sound sequences on a phrase basis. Then the model training unit 605 may sets the generated decision tree, as the training result 615, in the trained acoustic model unit 606 in the sound synthesis unit 602.

Next, processing by the sound synthesis unit 602 of FIG. 6 using the HMM model will be described. The trained acoustic model 606 loads the pitch data 215 on context for a pitch sequence in a phrase of a musical instrument sound of a musical instrument to be inputted from the keyboard 101 via the key scanner 206 and the CPU 201 to connect HMMs by referring to the decision trees 702, 703, and 704 of FIG. 7 and the like for each context. Then the trained acoustic model 606 predicts an acoustic feature sequence 617 (spectrum data 618 and sound source data 619) such that an output probability is maximized using each connected HMM.

At this time, the trained acoustic model unit 606 estimates an estimation value (symbol (2-5)) of the acoustic feature sequence 617 such that a conditional probability (symbol (2-4)) of the acoustic feature sequence 617 (symbol (2-3)) given the pitch data 215 (symbol (2-1)), which is input from the keyboard 101 via the key scanner 206 and the CPU 201, and the acoustic model (symbol (2-2)), which is set as the training result 615 using the machine learning in the model training unit 605 is maximized, according to Eq. (2). Using a state sequence (4-1) below estimated by the state duration model in (b) of FIG. 7, Eq. (2) is approximated as in Eq. (4) below as described in Non-patent Literature 1.

[Math 19]

$$\hat{o} = \underset{o}{\operatorname{argmax}} \sum_q P(o|q,\hat{\lambda})P(q|l,\hat{\lambda}) \quad (4)$$

$$\approx \underset{o}{\operatorname{argmax}} P(o|\hat{q},\hat{\lambda})$$

$$= \underset{o}{\operatorname{argmax}} \mathcal{N}\left(o_t | \mu_{\hat{q}}, \sum_{\hat{q}}\right)$$

$$= \mu_{\hat{q}}$$

[Math 20]

$$\hat{q} = \underset{q}{\operatorname{argmax}} P(q|l,\hat{\lambda}) \quad (4\text{-}1)$$

[Math 21]

$$\mu_{\hat{q}} = [\mu_{\hat{q}_1}^T, \ldots, \mu_{\hat{q}_T}^T]^T \quad (4\text{-}2)$$

$$\sum\nolimits_{\hat{q}} = \operatorname{diag}\left[\sum\nolimits_{\hat{q}_1}, \ldots, \sum\nolimits_{\hat{q}_T}\right], \quad (4\text{-}3)$$

The left sides of Eq. (4-2) and (4-3) above are a mean vector and a covariance matrix for a state (4-4) below, respectively.

[Math 22]

$$\hat{q}_t \quad (4\text{-}4)$$

Using a musical instrument sound feature sequence the mean vector and the covariance matrix are calculated by traversing each decision tree set in the trained acoustic model 606. According to Eq. (4), the estimation value (symbol (2-5)) of the acoustic feature sequence 617 is obtained using the mean vector of Eq. (4-2) above, which is a discontinuous sequence changing in a step-like manner at a state transition. If the synthesis filter unit 610 synthesizes the inferential musical sound data 217 from such discontinuous acoustic feature sequence 617, a low-quality, or unnatural musical instrument sound is generated. Therefore, in the first embodiment of the statistical sound synthesis processing, an algorithm for generating the training result 615 (model parameters) that takes dynamic features into consideration may be adopted in the model training unit 605. If an acoustic feature sequence (Eq. (5-1) below) in a framer is composed of the static features and the dynamic features, the acoustic feature sequence (Eq. (5-2) below) over time is expressed by Eq. (5-3) below.

[Math 23]

$$o_t = [c_t^T, \Delta c_t^T]^T \quad (5\text{-}1)$$

$$o = [o_1^T, \ldots, o_T^T]^T \quad (5\text{-}2)$$

$$o = Wc \quad (5\text{-}3)$$

In Eq. (5-3) above, W is a matrix for obtaining an acoustic feature sequence o including the dynamic features from the static feature sequence of Eq. (6-4) below $$c = [c_1^T, \ldots, c_T^T]^T \quad [\text{Math 24}]$$

The model training unit 605 solves Eq (4) above as expressed by Eq (6) below with Eq. (5-3) above a constraint.

[Math 25]

$$\hat{c} = \underset{c}{\operatorname{argmax}} \mathcal{N}\left(Wc | \mu_{\hat{q}}, \sum\nolimits_{\hat{q}}\right) \quad (6)$$

The left side of Eq. (6) above is a static feature sequence such that an output probability is maximized with the dynamic features a constraint. By taking the dynamic features into consideration, discontinuities at state boundaries can be solved to obtain an acoustic feature sequence 617 that changes smoothly. Thus, high-quality inferential musical sound data 217 can be generated in the synthesis filter unit 610.

Next, a second embodiment of the statistical sound synthesis processing by the sound training unit 601 and the sound synthesis unit 602 of FIG. 6 will be described. In the second embodiment of the statistical sound synthesis processing, in order to predict the acoustic feature sequence 617 from the pitch data 215, the trained acoustic model unit 606 is implemented using a deep neural network (DNN). Correspondingly, the model training unit 605 in the sound training unit 601 is configured to learn model parameters representing a non-linear transformation functions for neurons in the DNN from musical instrument sound features (training score data set 611) to acoustic features (training acoustic feature sequence 614) and output the model parameters to the DNN of the trained acoustic model unit 606 in the sound synthesis unit 602 as the learning result 615.

Normally, the acoustic features are calculated every frame having a width of, for example, 5.1 msec, and the musical instrument sound features every note. Therefore, the time units for the acoustic features and the musical instrument sound features are different. In the first embodiment of the statistical sound synthesis processing using the HMM acoustic model, correspondence between the acoustic features and the musical instrument sound features is expressed using a state sequence of the HMM, and the model training unit 605 automatically learns the correspondence between the acoustic features and the musical instrument sound features based on the training score data set 611 and the training performance data set 612 of FIG. 6. In contrast, in the second embodiment of the statistical sound synthesis processing using the DNN, since the DNN set in the trained acoustic model unit 606 is a model representing a one-to-one correspondence between the pitch data 215 as input and the acoustic feature sequence 617 as output, the DNN cannot be trained using a pair of input and output data whose time units are different. For this reason, in the second embodiment of the statistical sound synthesis processing, the correspondence is set in advance between the acoustic feature sequence, whose unit is a frame, and the musical instrument sound feature sequence, whose unit is a note, and a pair of the acoustic feature sequence and the musical instrument sound feature sequence is generated whose unit is a frame.

Figure 8:
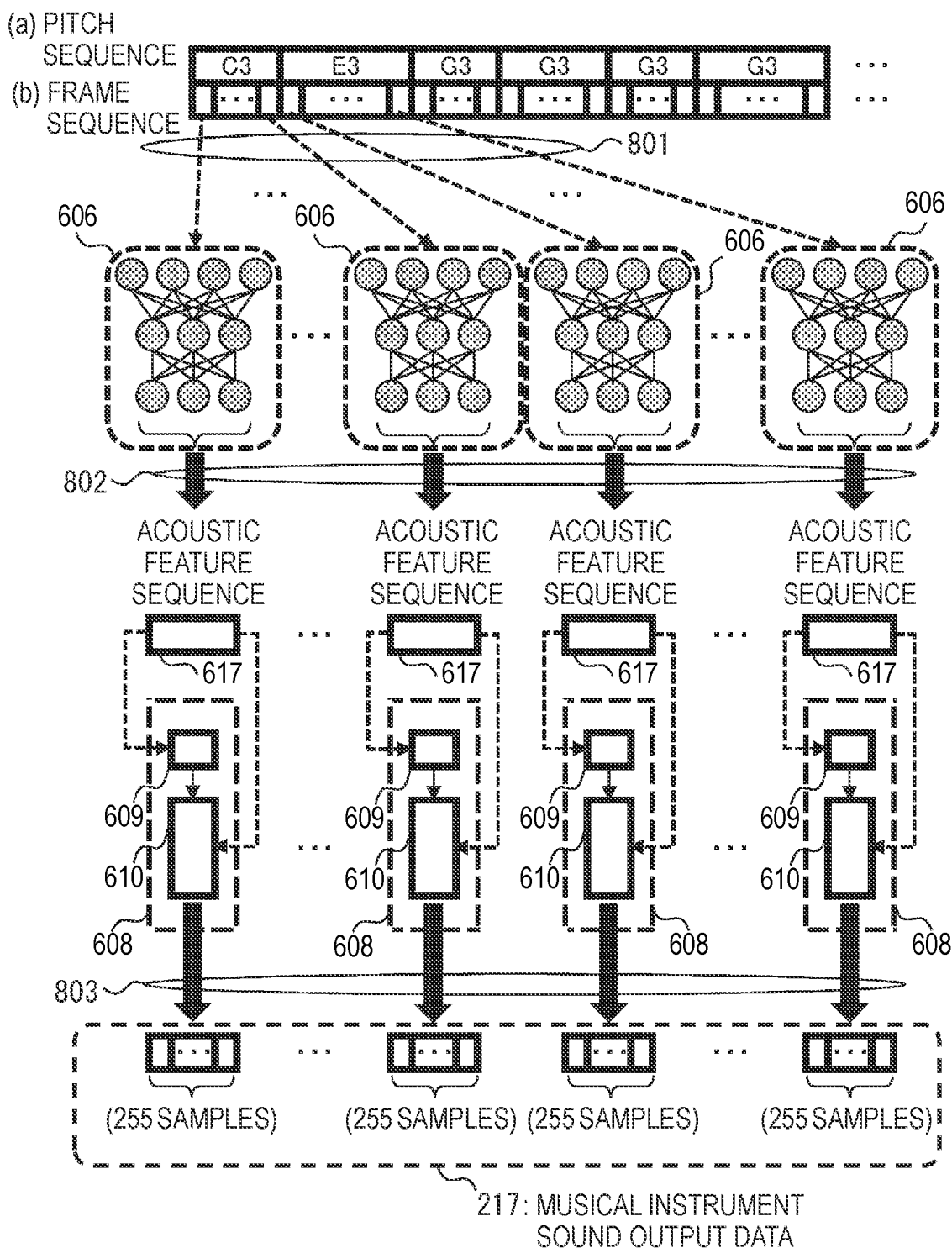
FIG. 8 illustrates a second embodiment of the statistical sound synthesis processing.

FIG. 8 illustrates operations of the sound synthesis LSI 205 showing the correspondence above. For example, if a musical instrument note sequence is given, which is a musical instrument sound feature sequence corresponding to a pitch sequence (string) of "C3," "E3," "G3," "G3," "G3," "G3," and so on ((a) of FIG. 8) in a phrase of a piece of music, the musical instrument sound feature sequence is associated with the acoustic feature sequence ((b) of FIG. 8), whose unit is a frame, in a one-to-many correspondence ((a) and (b) in FIG. 8). Note that, since used as input into the DNN in the trained acoustic model unit 606, the musical instrument sound features has to be expressed as numerical data. For this reason, as the musical instrument sound feature sequence, numerical data obtained by concatenating binary (0 or 1) or continuous value data for context-related questions such as "The previous note is x?" and "The musical instrument of the current note is y?" is used.

In the second embodiment of the statistical sound synthesis processing, as shown with broken arrows 801 in FIG. 8, the model training unit 605 in the sound training unit 601 of FIG. 6 trains the DNN by sequentially passing pairs, whose unit is a frame, of the training score data set 611, which is the note sequence (pitch sequence) of a phrase and corresponds to (a) of FIG. 8, and the training acoustic feature sequence 614 of a phrase, which corresponds to (h) of FIG. 8, to the DNN in the trained acoustic model unit 606. Note that, the DNN in the trained acoustic model unit 606 includes neurons, shown as gray circles in FIG. 8, consisting of an input layer, one or more hidden layers, and an output layer.

On the other hand, when a sound is synthesized, pitch data 215 whose unit is a frame, which is a note sequence (pitch sequence) of a phrase and corresponds to (a) of FIG. 8, is input into the DNN in the trained acoustic model unit 606. Accordingly, the DNN in the trained acoustic model unit 606 outputs an acoustic feature sequence 617 of the phrase whose unit is a frame, as shown by bold solid arrows 802 in FIG. 8. Therefore, also in the sound model unit 608, the sound source data 619 and the spectrum data 618 that are included in the acoustic feature sequence 617 of the phrase and whose units are a frame are given to the oscillation generation unit 609 and the synthesis filter unit 610, respectively, thereby the sound synthesis being performed.

Consequently, the sound model unit 608 outputs the inferential musical sound data 217 of the phrase by a frame corresponding to, for example, 225 samples as shown by bold solid arrows 803 in FIG. 8. Since the frame has a width of 5.1 msec, one sample corresponds 5.1 msec/225≈0.0227 msec. The sampling rate of the inferential musical sound data 217 is therefore 1/0.0227≈44 kHz.

The DNN is trained using a pair of the acoustic features and the music instrument features (a pitch sequence and a music instrument) of a phrase, whose units are a frame, according to an ordinary least square criterion, Eq. (7) below.

[Math 26]

$$\hat{\lambda} = \underset{\lambda}{\operatorname{argmin}} \frac{1}{2} \sum_{t=1}^{T} \|o_t - g_\lambda(l_t)\|^2 \tag{7}$$

The following symbol denotes acoustic features in a frame t, which is numbered t.

$$o_t \tag{Math 27}$$

The following symbol denotes the musical instrument sound features (pitch and a musical instrument) in a frame t, which is numbered t.

$$l_t \tag{Math 28}$$

The following symbol denotes the model parameters of the DNN in the trained acoustic model unit 606.

$$\hat{\lambda} \tag{Math 29}$$

The following symbol denotes the non-linear transformation functions represented by the DNN. The model parameters of the DNN can be efficiently estimated using back-propagation.

$$g_\lambda(\cdot) \tag{Math 30}$$

Considering correspondence with processing by the model training unit 605 in the statistical sound synthesis represented by Eq. (1) above, training of the DNN can be represented as in Eq. (8) below

[Math 31]

$$\hat{\lambda} = \underset{\lambda}{\operatorname{argmin}} P(o \mid l, \lambda) \tag{8}$$
$$= \underset{\lambda}{\operatorname{argmax}} \prod_{t=1}^{T} \mathcal{N}\left(o_t \mid \tilde{\mu}_t, \tilde{\sum}_t\right)$$

In Eq. (8) above, Eq. (9) below holds.

[Math 32]

$$\tilde{\mu}_t = g_\lambda(l_t) \tag{9}$$

As in Eqs. (8) and (9) above, relationships between the acoustic features and the musical instrument sound features (pitch and a musical instrument) can be expressed using a normal distribution as in Eq. (9-1) with output of the DNN a mean vector.

[Math 33]

$$\mathcal{N}(o_t \mid \tilde{\mu}_t, \tilde{\Sigma}_t) \tag{9-1}$$

Normally, in the second embodiment of the statistical sound synthesis processing using the DNN, used is a covariance matrix independent on the musical instrument sound feature sequence $l_t$, i.e., a covariance matrix (Eq. (9-2) below) common to all frames.

[Math 34]

$$\tilde{\Sigma}_g \tag{9-2}$$

If the covariance matrix of Eq. (9-2) above is the identity matrix, Eq. (8) above expresses training processing equivalent to Eq. (7) above.

As described in FIG. 8, the DNN in the trained acoustic model unit 606 is configured to predict the acoustic feature sequence 617 every frame independently. For this reason, the acoustic feature sequence 617 obtained may include discontinuity lowering a quality of a synthesized sound. Accordingly, a parameter generation algorithm using dynamic features, which is similar to the first embodiment of the statistical sound synthesis processing, can be used to improve the quality of the synthesized sound in the present embodiment.

In the following, more specific operations of the electronic keyboard instrument 100 shown in FIGS. 1 and 2 for implementing the second embodiment of the loop recording/playback processing that is executed by the looper LSI 220 of FIG. 2 will be described in detail using the inferential musical sound data 217 that is output by the sound synthesis LSI 205 of FIG. 2. In the second embodiment of the loop recording/playback processing, a plurality of continuous phrases can be set as a loop section.

In the second embodiment of the loop recording/playback processing, in a state (hereinafter, referred to as "Mode0") in which the loop recording/playback processing is not being performed, the looper LSI 220 shifts to an operation of Mode1 to be described below when the user steps on the pedal 105 of FIG. 1 once. In Mode1, when the user performs a performance of designating a desired pitch sequence for each phrase on the keyboard 101 of FIG. 1, the sound synthesis LSI 205 of FIG. 2 outputs the inferential musical sound data 217, to which performance expression sound data including a sound corresponding to the performance technique not performed by the user is added, in a phrase unit with a delay of one phrase (one measure in the present embodiment), as described with reference to FIGS. 6 to 8. The loop recording unit 303 shown in FIG. 3 within the looper LSI 220 of FIG. 2 executes processing of sequentially storing the inferential musical sound data 217, which is output on a phrase basis from the sound synthesis LSI 205 for each phrase as described above according to the pitch sequence that is performed by the user, in the first loop storage area 301 via the mixer 307. The user performs the above performance while counting the plurality of phrases (measures), in conformity to the rhythm sound emitted from the speaker (not shown) via the mixer 213, the digital-to-analog converter 211, and the amplifier 214 from the sound module LSI 204, for example, thereby causing the looper LSI 220 to execute the operation of Mode1.

Thereafter, when the user steps on the pedal 105 again, the looper LSI 220 shifts to an operation of Mode2 to be described below. In Mode2, the loop playback unit 304 of FIG. 3 is configured to sequentially load the inferential musical sound data 217 of a section (hereinafter, referred to as "loop section") of the plurality of phrases (measures) stored in the first loop storage area 301, as the loop-playback sound 310. The loop-playback sound 310 is input into the mixer 213 of FIG. 2, as the loop-playback inferential musical sound data 222 of FIG. 2, and is emitted from the speaker (not shown) via the digital-to-analog converter 211 and the amplifier 214. The user further performs, on the keyboard 101 of FIG. 1, a performance of designating a desired pitch sequence corresponding to a musical sound that the user wants to loop-record with superimposing it on the loop-playback sound 310, for each phrase in the loop section, in conformity to the loop-playback sound 310. As a result, the sound synthesis LSI 205 of FIG. 2 outputs the inferential musical sound data 217, to which rich musical expression has been added, in a phrase unit with a delay of one phrase, similar to the case of Mode1. The mixer 307 of FIG. 3 is configured to mix the inferential musical sound data 217, which is input from the sound synthesis LSI 205 in a phrase unit with a delay of one phrase with respect to the user's performance, with the loop-playback sound delay output 311 obtained by delaying the loop-playback sound 310 output from the loop playback unit 304 by one phrase in the phrase delay unit 305 and to input the mixed data to the loop recording unit 303. The loop recording unit 303 is configured to execute processing of sequentially storing the mixed (so-called overdubbed) inferential musical sound data into the second loop storage area 302 of FIG. 3. When the overdubbing operation reaches to an end of the loop section, the loop playback unit 304 switches the loading source of the loop-playback sound 310 from the end of the loop of the first loop storage area 301 to the beginning of the loop of the second loop storage area 302. The loop recording unit 303 is configured to switch a recording destination of the inferential musical sound data from the end of the second loop storage area 302 to the beginning of the first loop storage area 301. In addition, when the operation reaches to the end of the loop section, the loop playback unit 304 again switches the loading source of the loop-playback sound 310 from the end of the loop of the second loop storage area 302 to the beginning of the loop of the first loop storage area 301. The loop recording unit 303 is configured to again switch the recording destination of the inferential musical sound data from the end of the first loop storage area 301 to the beginning of the second loop storage area 302. The switching control operation is repeated, so that the user can generate the loop-playback sound 310 of the loop section while sequentially overdubbing the inferential musical sound data 217 obtained based on the user's performance to the loop-playback sound 310 of the loop section.

Thereafter, when the user steps on the pedal 105 again, the looper LSI 220 shifts to an operation of Mode 3 to be described below. In Mode 3, the loop playback unit 304 of FIG. 3 is configured to repeatedly play back the loop-playback sound 310 in the loop section from the last recorded area of the first loop storage area 301 or the second loop storage area 302 and to output it as the inferential musical sound data 222. The inferential musical sound data 217 that is repeatedly played back is emitted from the speaker (not shown) via the digital-to-analog converter 211 and the amplifier 214 from the mixer 213 of FIG. 2. In this way, even when the user performs a monotonous performance of designating the pitch of each note in a phrase unit on the keyboard 101 of FIG. 1, it is possible to play back the loop-playback sound 310 having rich musical expression (dynamics of output sound can fluctuate according to the performance, sound or acoustic effects can be added, and an unplayed note can be supplemented) generated via the sound synthesis LSI 205. At this time, when the user further performs the performance, the musical sound output data, which is output from the sound module LSI 204 of FIG. 2 based on the performance, is mixed with the loop-playback sound 310 in the mixer 213 of FIG. 2 and the mixed sound can be emitted from the speaker (not shown) via the digital-to-analog converter 211 and the amplifier 214, so that it is possible to implement an ensemble of the loop playback and the user's performance.

Thereafter, when the user again steps on the pedal 105 once in the loop playback state of Mode 3, the looper LSI 220 returns to the operation of Mode2 and can further perform the overdubbing.

In addition, when the user holds the pedal 105 in the overdubbing state of Mode2, the looper LSI 220 cancels the last-recorded loop recording, shifts to Mode 3, and returns to the previous loop recording state. Further, when the user again steps on the pedal 105 once, the looper LSI 220 returns to the operation of Mode2 and further proceeds with the overdubbing.

In the state of Mode1, Mode2, or Mode 3, when the user steps on the pedal 105 promptly twice, the looper LSI 220 shifts to the stop state of Mode® to end the loop recording/playback.

Figure 9:
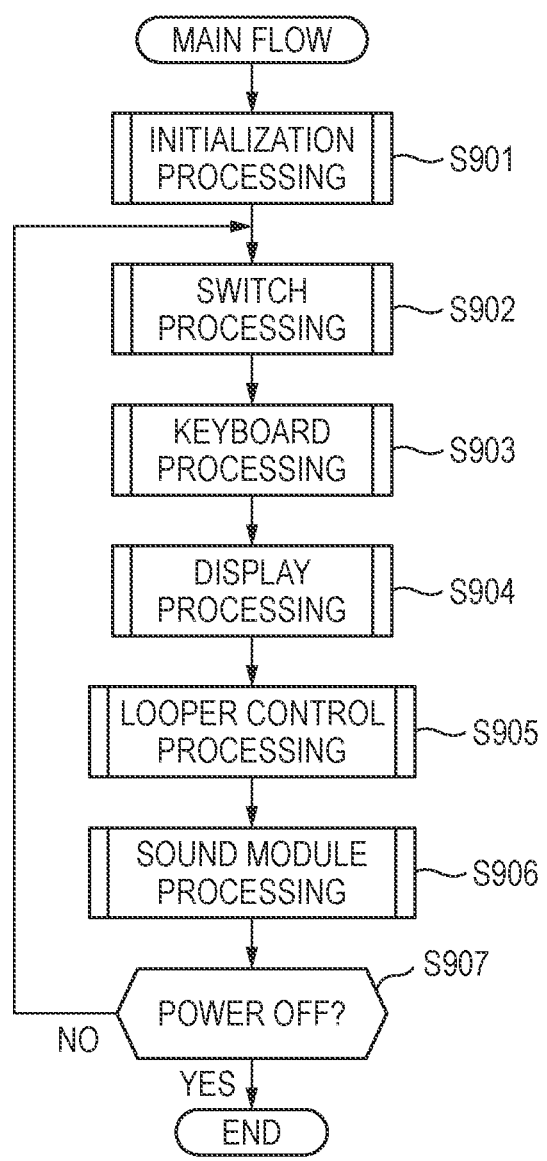
FIG. 9 is a main flowchart showing a control processing example of an electronic musical instrument according to a second embodiment of the loop recording/playback processing.

FIG. 9 is a main flowchart showing a control processing example of the electronic musical instrument in a second embodiment of the loop recording/playback processing. This control processing is an operation of executing a control processing program that is loaded from the ROM 202 to the RAM 203 by the CPU 201 of FIG. 2.

After executing initialization processing (step S901), the CPU 201 repeatedly executes a series of processing from step S902 to step S907.

In the repeating processing, the CPU 201 first executes switch processing (step S902). The CPU 201 executes processing corresponding to a switch operation on the first switch panel 102 or the second switch panel 103 of FIG. 1, based on an interrupt from the key scanner 206 of FIG. 2.

Then the CPU 201 executes keyboard processing of determining and processing whether any one key of the keyboard 101 of FIG. 1 is operated based on the interrupt from the key scanner 206 of FIG. 2 (step S903). In the keyboard processing, the CPU 201 outputs musical sound production control data 216 for instructing note-on or note-off to the sound module LSI 204 of FIG. 2 according to the user performing a key press or release operation on a key. In addition, in the keyboard processing, the CPU 201 executes processing of sequentially storing pitch of the pressed key into a phrase buffer that is an array variable on the RAM 203, for output processing of a pitch sequence to the sound synthesis LSI 205 in a phrase unit in TickTime interrupt processing to be described later.

Then the CPU 201 executes display processing of processing data, which is to be displayed on the LCD 104 of FIG. 1, and displaying the data on the LCD 104 via the LCD controller 208 of FIG. 2 (step S904). Data displayed on the LCD 104 is, for example, a score corresponding to the inferential musical sound data 217 played and a various setting contents.

Then the CPU 201 executes looper control processing (step S905). In this processing, the CPU 201 executes looper control processing (processing of the flowcharts of FIGS. 14 and 15 to be described later) that is processing of controlling the looper LSI 220 of FIG. 2, Subsequently, the CPU 201 executes sound source processing (step S906). In the sound source processing, the CPU 201 executes control processing such as envelope control of a musical sound during sound production in the sound module LSI 204.

Finally, the CPU 201 determines whether the user pushes a power-off switch (not shown) to turn off the power (step S907), When the determination in step S907 is NO, the CPU 201 returns to the processing of step S902. When the determination in step S907 is YES, the CPU 201 ends the control processing shown in the flowchart of FIG. 9 and turns off the power supply of the electronic keyboard instrument 100.

Figure 10A:
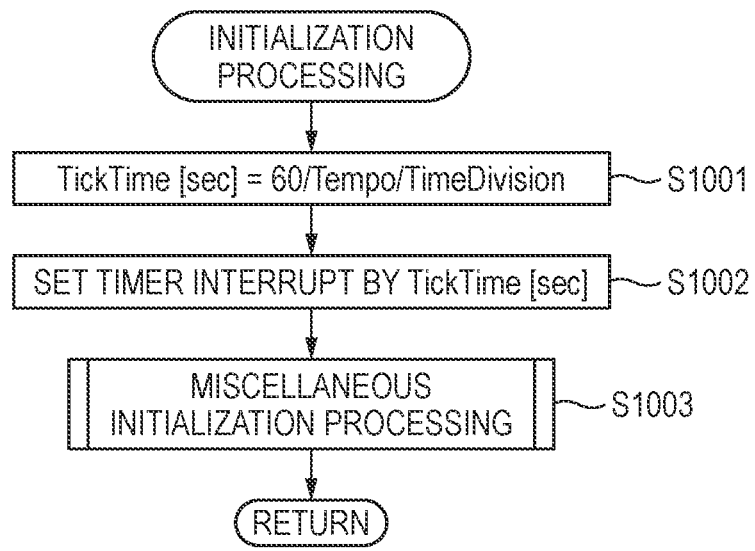
FIG. 10B is a flowchart showing a detailed example of tempo-change processing.
Figure 10B:
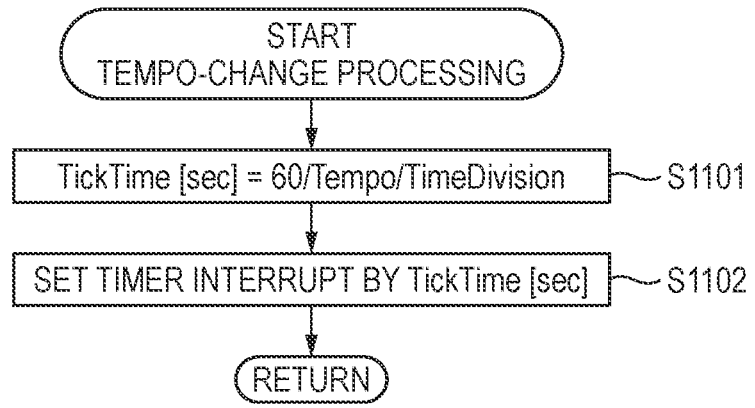

FIG. 10A is a flowcharts showing a detailed example of the initialization processing of step S901 in FIG. 9. FIG. 10B is a flowchart showing a detailed example of tempo-change processing of step S1102 of FIG. 11 to be described later in the switch processing of step S902 in FIG. 9.

First, in FIG. 10A showing a detailed example of the initialization processing of step S901 in FIG. 9, the CPU 201 executes initialization processing of TickTime. In the present embodiment, the progress of the loop performance proceeds in a unit of a value of a TickTime variable (hereinafter, the value of this variable is referred to as "TickTime" that is the same as the variable name) stored in the RAM 203, In the ROM 202 of FIG. 2, a value of a TimeDivision constant (hereinafter, the value of this variable is referred to as "TimeDivision" that is the same as the variable name) is set in advance, which is a resolution of a quarter note. For example, when this value is 480, the quarter note has duration of 480×TickTime. Note that, the value of TimeDivision may also be stored in the RAM 203, and the user may change it, for example, with a switch on the first switch panel 102 of FIG. 1. In addition, as variables that are stored in the RAM 203 of FIG. 2, counted by TickTime are: a value of a pointer variable (a value of PhrasePointer value to be described later; hereinafter, the value of this variable is referred to as "PhasePointer" that is the same as the variable name) for determining that the user has performed a performance of one phrase; a value of a pointer value (a value of RecPointer value to be described later; hereinafter, the value of this variable is referred to as "RecPointer" that is the same as the variable name) for progressing recording of the loop performance; and a value of a pointer variable (a value of PlayPointer value to be described later; hereinafter, the value of this variable is referred to as "PlayPointer" that is the same as the variable name) for progressing loop reproduction. How many seconds 1 TickTime actually corresponds is depending on the tempo designated for song data. If a value set for a Tempo variable on the RAM 203 according to a user setting is Tempo [beat/min], the number of seconds corresponding to 1 TickTime is calculated by the equation below $$\text{TickTime[sec]}=60/\text{Tempo}/\text{TimeDivision} \qquad (10)$$

Therefore, in the initialization processing exemplified in the flowchart of FIG. 10A, the CPU 201 first calculates TickTime [sec] by calculation processing corresponding to the Eq. (10) above and stores it in the variable of the same name on the RAM 203 (step S1001), Note that, as a value of Tempo that is set for a variable Tempo, a predetermined value loaded from constants in the ROM 202 of FIG. 2, for example, 60 [beat/sec] may be set in an initial state. Alternatively, the variable Tempo may be stored in a non-volatile memory, so that a Tempo value at a shutdown is recovered when the power supply of the electronic keyboard instrument 100 is again turned on.

Subsequently, the CPU 201 sets a timer interrupt by TickTime [sec] calculated in step S1001 for the timer 210 of FIG. 2 (step S1002). As a result, each time the TickTime [sec] elapses in the timer 210, an interrupt (hereinafter, referred to as "TickTime interrupt") for phrase progress for the sound synthesis LSI 205 and loop recording/playback progress for the looper LSI 220 occurs with respect to the CPU 201. Therefore, in TickTime interrupt processing (a flowchart of FIG. 12 to be described later) executed by the CPU 201 based on the TickTime interrupt, control processing of determining a phrase every 1 TickTime and progressing loop recording/playback is executed.

Subsequently, the CPU 201 executes miscellaneous initialization processing such as initialization of the RAM 203 of FIG. 2 (step S1003). Thereafter, the CPU 201 ends the initialization processing of step S901 of FIG. 9 exemplified in the flowchart of FIG. 10A.

Figure 11:
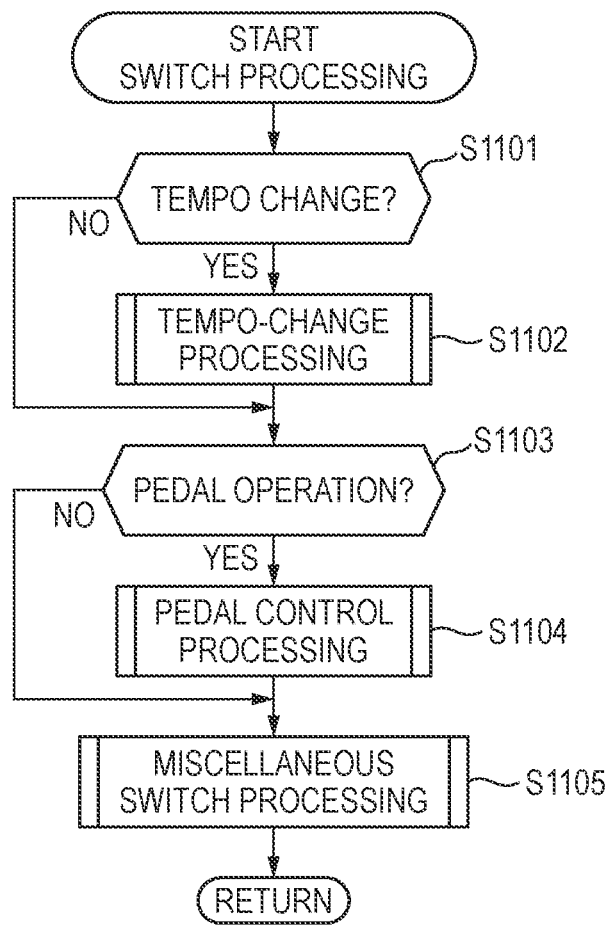
FIG. 11 is a flowchart showing a detailed example of switch processing.

The flowchart of FIG. 10B will be described later. FIG. 11 is a flowchart showing a detailed example of the switch processing of step S902 in FIG. 9.

The CPU 201 first determines whether tempo for phrase progress and loop recording/playback progress has been changed by the tempo-change switch in the first switch panel 102 (step S1101), When the determination is YES, the CPU 201 executes tempo-change processing (step S1102). This processing will be described in detail later with reference to FIG. 10B. When the determination in step S1101 is NO, the CPU 201 skips over the processing of step S1102.

Subsequently, the CPU 201 determines whether the user has stepped on the pedal 105 of FIG. 1 with a foot or the like for loop recording/playback in the looper LSI 220 via the key scanner 206 of FIG. 2 (step S1103). When the determination is YES, the CPU 201 executes pedal control processing (step S1104), This processing will be described in detail later with reference to FIG. 14. When the determination in step S1103 is NO, the CPU 201 skips over the processing of step S1104.

Finally, the CPU 201 executes other switch processing corresponding to a case in which a selection of a sound module tone of the electronic keyboard instrument 100, a musical instrument whose sound to be sound-synthesized in the sound synthesis LSI 205, and the like is performed on the second switch panel 103 of FIG. 1 (step S1105), The CPU 201 stores the sound module tone and the musical instrument to be sound-synthesized in variables (not shown) on the RAM 203 (step S1104). Thereafter, the CPU 201 ends the switch processing of step S902 of FIG. 9 exemplified in the flowchart of FIG. 11.

FIG. 10B is a flowchart showing a detailed example of the tempo-change processing of step S1102 in FIG. 11. As described above, when the tempo value is changed, TickTime [sec] also changed. In the flowchart of FIG. 10B, the CPU 201 executes control processing relating to the change of TickTime [sec]

First, similar to the case of step S1001 of FIG. 11.0A that is executed in the initialization processing of step S901 of FIG. 9, the CPU 201 calculates TickTime [sec] by the calculation processing corresponding to Eq. (10) above (step S1011). Note that, it is assumed that, as for the tempo value Tempo, a value after change by the tempo change switch in the first switch panel 102 of FIG. 1 is stored in the RAM 203 or the like.

Subsequently, similar to the case of step S1002 of FIG. 10A that is executed in the initialization processing of step S901 of FIG. 9, the CPU 201 sets a timer interrupt by the TickTime [sec] calculated in step S1011 for the timer 210 of FIG. 2 (step S1012). Thereafter, the CPU 201 ends the tempo-change processing of step S1102 of FIG. 11 exemplified in the flowchart of FIG. 10B.

Figure 12:
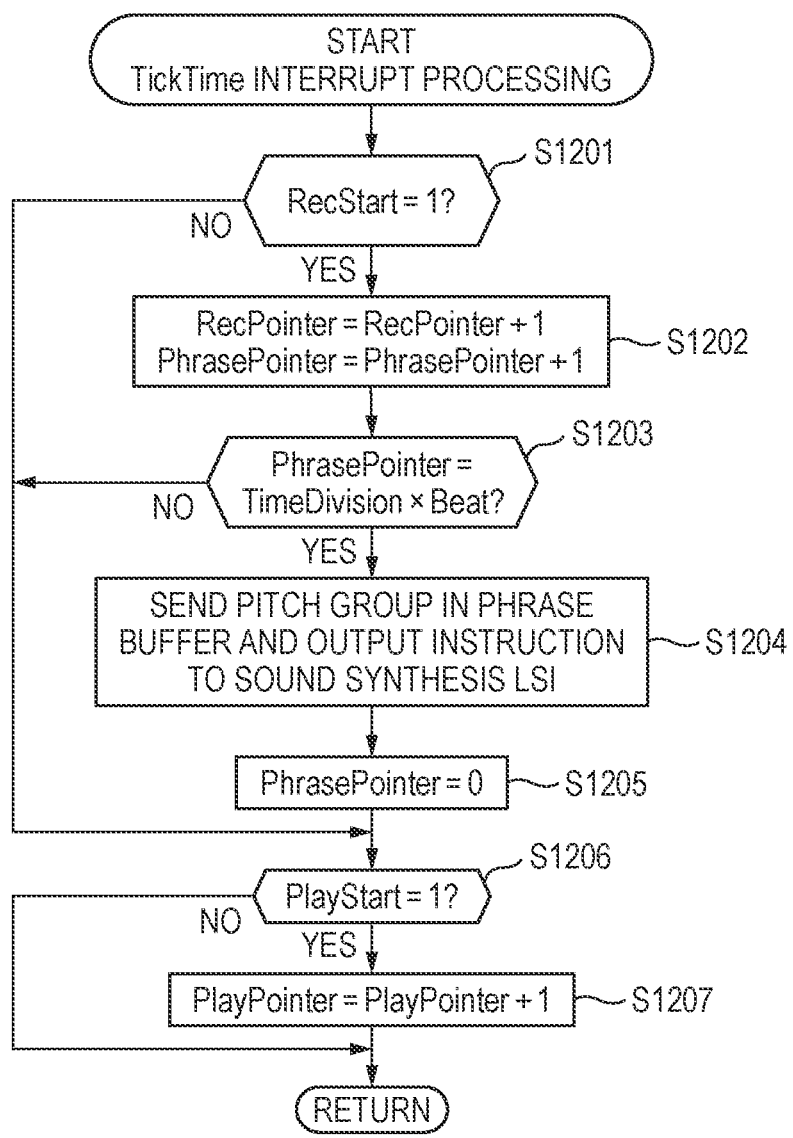
FIG. 12 is a flowchart showing a detailed example of tick-time interrupt processing.

FIG. 12 is a flowchart showing a detailed example of TickTime interrupt processing that is executed based on the TickTime interrupt (refer to step S1002 of FIG. 10A or step S1012 of FIG. 10B) occurring every TickTime [sec] in the timer 210 of FIG. 2.

First, the CPU 201 determines whether a value of a variable RecStart (hereinafter, the value of this variable is referred to as "RecStart" that is the same as the variable name) on the RAM 203 is 1, i.e., whether a loop recording progress is instructed (step S1201).

When it is determined that the loop recording progress is not instructed (the determination of step S1201 is NO), the CPU 201 proceeds to processing of step S1206 without executing processing of controlling the loop recording progress in steps S1202 to S1205.

When it is determined that the loop recording progress is instructed (the determination of step S1201 is YES), the CPU 201 increments, by a value of 1, a value of a variable RecPointer (hereinafter, the value of this variable is referred to as "RecPointer" that is the same as the variable name) on the RAM 203 for controlling time progress in a unit of TickTime in the loop section for recording on the first loop storage area 301 or the second loop storage area 302 of FIG. 3, in response to the TickTime interrupt progressing by a 1 unit. In addition, the CPU 201 increments, by a value of 1, a value of a variable PhrasePointer (hereinafter, the value of this variable is referred to as "PhrasePointer" that is the same as the variable name) on the RAM 203 for controlling time progress in a unit of TickTime in the phrase section (step S1202).

Subsequently, the CPU 201 determines whether the value of PhrasePointer becomes the same as a value defined by TimeDivision×Beat (step S1203). As described above, the value of TimeDivision is based on TickTime, which is the number of TickTime a quarter note corresponds to. In addition, Beat is a value (hereinafter, the value of this variable is referred to as "Beat" that is the same as the variable name) on the RAM 203 that stores a value indicating how many beats (how many quarter notes are included in one measure (one phrase)) a piece of music that the user will start playing is. For example, If it is 4 beats, Beat=4, and, if it is 3 beats, Beat=3. The value of Beat can be set by the user, for example, via the switch on the first switch panel 102 of FIG. 1. Therefore, the value of TimeDivision×Beat corresponds to TickTime of one measure of a piece of music currently played. Specifically, in step S1203, the CPU 201 determines whether the value of PhrasePointer becomes the same as the TickTime of one measure (one phrase) defined by Time Division×Beat.

When it is determined that the value of PhrasePointer reaches the TickTime of one measure (the determination of step S1203 is YES), the CPU 201 sends the pitch sequence based on each key pressed on the keyboard 101 of FIG. 1 by the user, which is stored in the phrase buffer on the RAM 203 by the keyboard processing of step S903 of FIG. 9, to the sound synthesis LSI 205 of FIG. 2 as the pitch data 215 of one phrase described in FIG. 6 together with the data relating to the musical instrument for sound synthesis designated in advance by the user (refer to the description of the other switch processing of step S1105 of FIG. 11 in the switch processing of step S902 of FIG. 9) during a section with the TickTime of one measure (one phrase). Then the CPU 201 synthesizes the inferential musical sound data 217 of one phrase according to the statistical sound synthesis processing described with reference to FIGS. 6 to 8 and instructs outputting it to the looper LSI 220 (step S1204), Thereafter, the CPU 201 resets the value of PhrasePointer to 0 (step S1205).

When it is determined that the value of PhrasePointer does not reach the TickTime of one measure (the determination in step S1203 is NO), the CPU 201 executes only the increment processing of RecPointer and PhrasePointer in step S1202 without executing the processing of step S1204 and step S1205 and shifts to processing of step S1206.

Subsequently, the CPU 201 determines whether a value of a variable PlayStart (hereinafter, the value of this variable is referred to as "PlayStart" that is the same as the variable name) on the RAM 203 is 1, i.e., loop playback progress is instructed (step S1206).

When it is determined that the loop playback progress is instructed (the determination of step S1206 is YES), the CPU 201 increments, by 1, a value of a variable PlayPointer (hereinafter, the value of this variable is referred to as "PlayPointer" that is the same as the variable name) on the RAM 203 for controlling the loop section for loop playback on the first loop storage area 301 or the second loop storage area 302 of FIG. 3 in response to the TickTime interrupt progressing by a unit.

When it is determined that the loop playback progress is not instructed (the determination of step S1206 is NO), the CPU 201 ends the TickTime interrupt processing shown in the flowchart of FIG. 12 without executing the increment processing of PlayPointer in step S1207 and returns to execution of any one processing of the main flowchart of FIG. 9.

Subsequently, pedal control processing of step S1104 in FIG. 11 in the switch processing of step S902 of FIG. 2 and loop recording/playback processing from Mode0 to Mode 3 that is implemented in the looper LSI 220 of FIG. 2 based on the looper control processing of step S905 of FIG. 9 are described in detail with reference to flowcharts of FIGS. 13 to 15 and operation illustrations of FIGS. 16 and 17.

Figure 16:
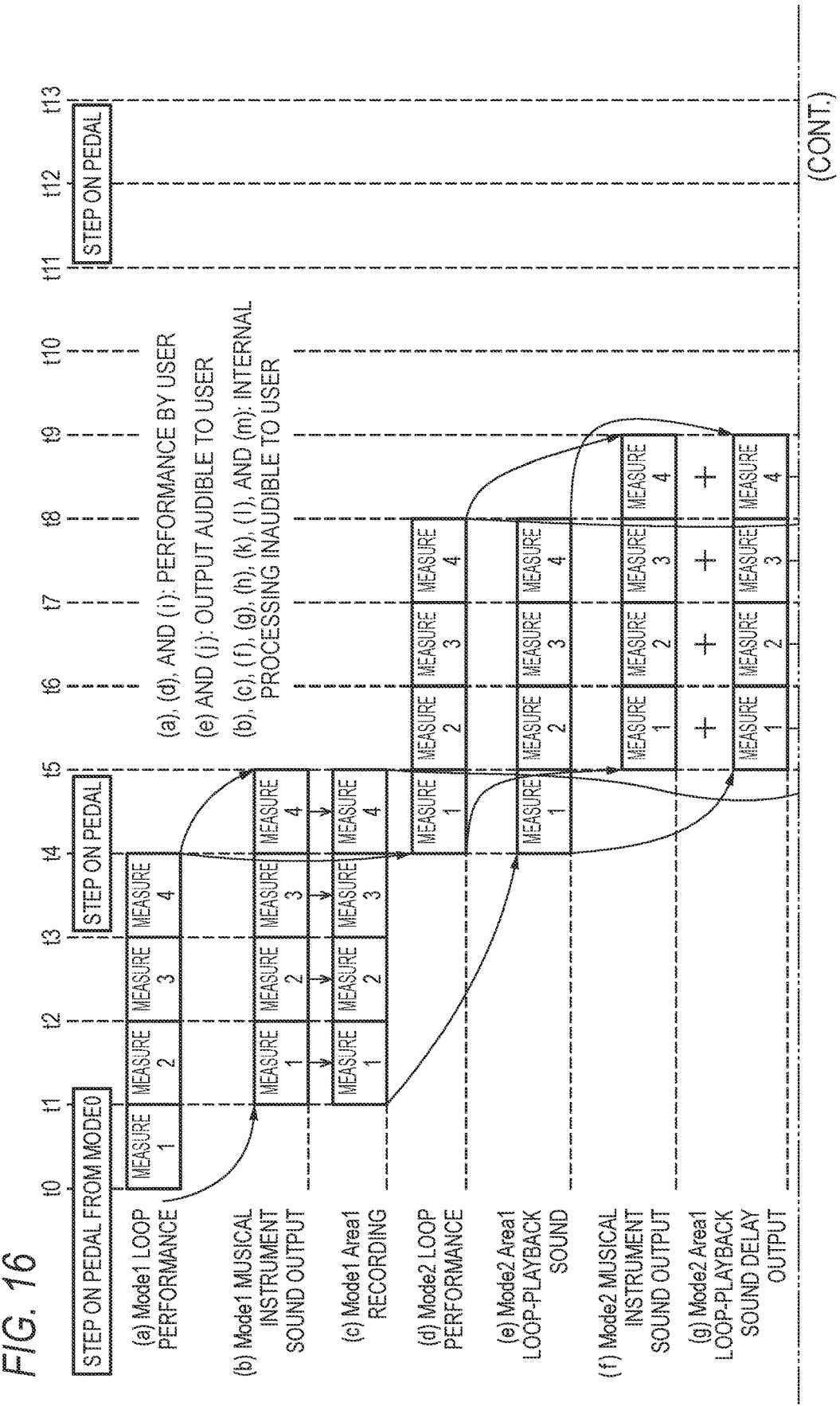
FIG. 16 is a first timing chart of a second embodiment of the loop recording/playback processing.
Figure 17:
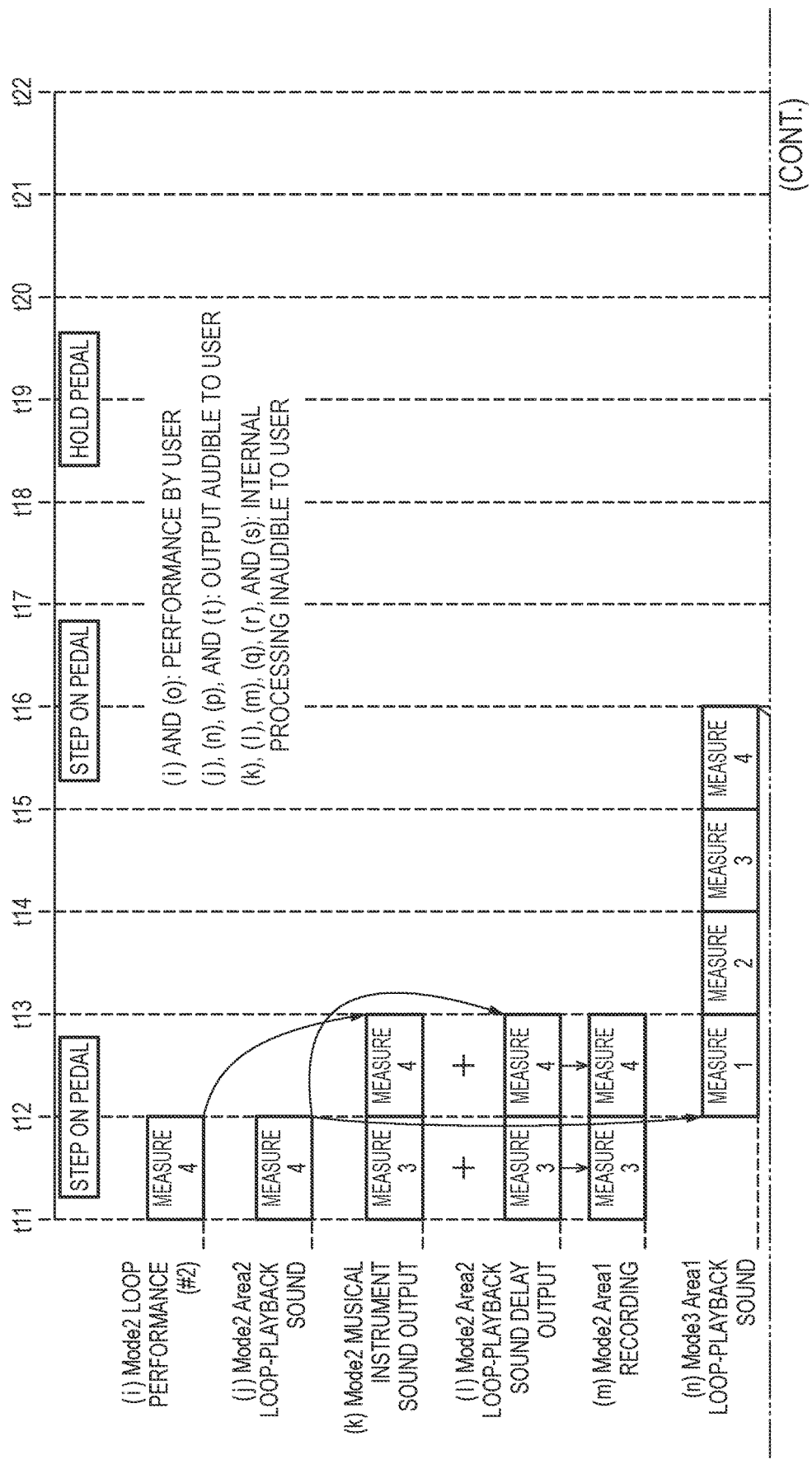
FIG. 17 is a second timing chart of the second embodiment of the loop recording/playback processing.

In the operation illustrations of FIGS. 16 and 17, t0 in FIG. 16 to t22 in FIG. 17 indicates a time of one measure interval=one phrase interval=TimeDivision×Beat refer to the description of step S1203 in FIG. 12) progressing on a TickTime basis. In the following, it is assumed that the description like "time t0" means that the time is on a TickTime basis. In addition, in descriptions below it is assumed that "measure" and "phrase" are used interchangeably and are unified as "measure."

Figure 13:
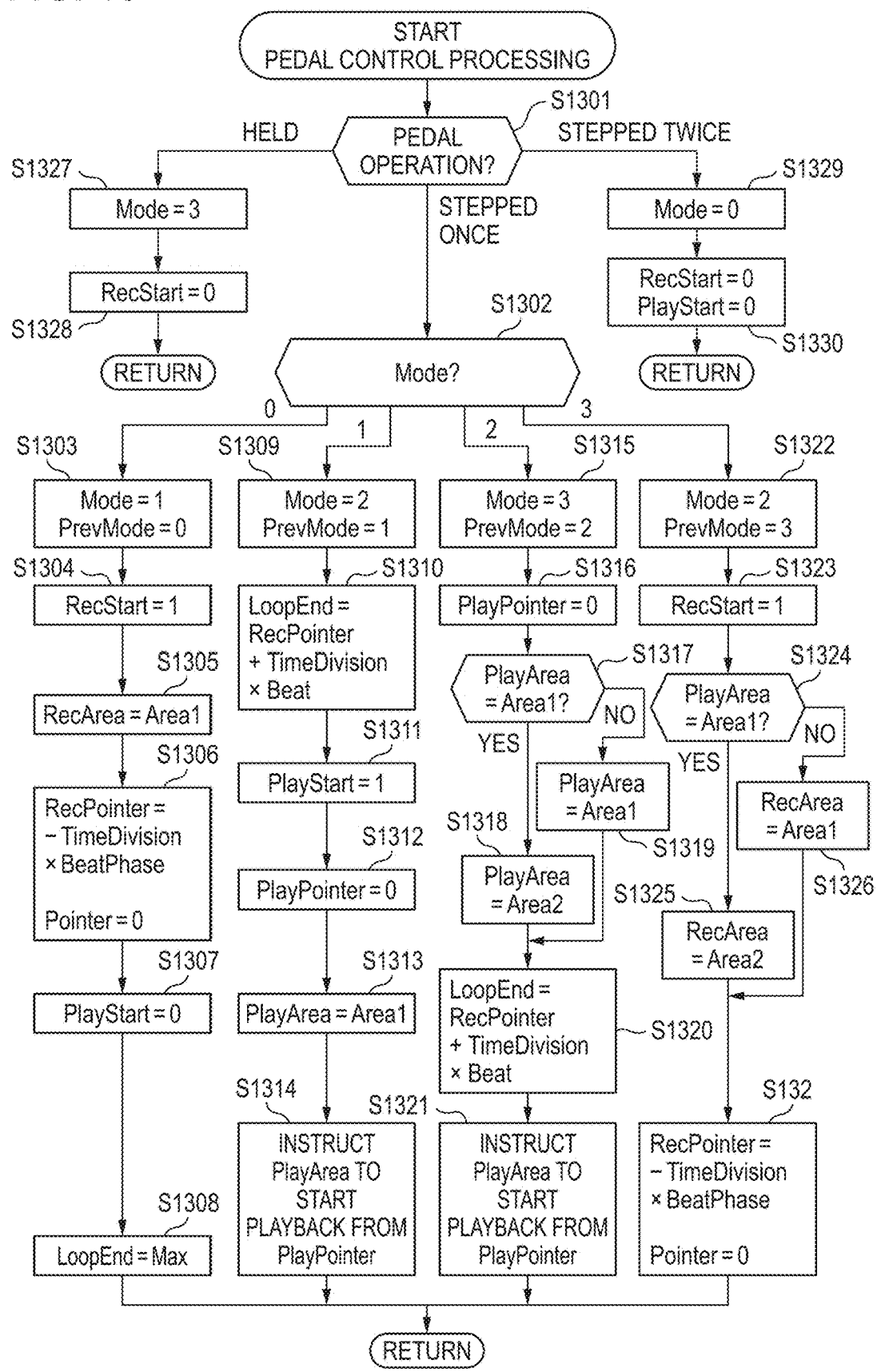
FIG. 13 is a flowchart showing a detailed example of pedal control processing.

FIG. 13 is a flowchart showing details of the pedal control processing of step S1104 of FIG. 11 in the switch processing of step S902 of FIG. 9. First, it is assumed that, immediately after the power supply of the electronic keyboard instrument 100 is turned on, a value of a variable Mode (hereinafter, the value of this variable is referred to as "Mode" that is the same as the variable name), a value of a variable PrevMode (hereinafter, the value of this variable is referred to as "PrevMode" that is the same as the variable name), and the value of the value RecStart on the RAM 203 shown in HQ. 13 are each reset to 0 in the miscellaneous initialization processing of step S1003 of FIG. 10A in step S901 of FIG. 9, for example.

In the pedal control processing of FIG. 13, the CPU 201 first detects a type of the pedal operation after the operation on the pedal 105 is detected in step S1103 of FIG. 11 via the key scanner 206 of FIG. 2 (step S1301).

When it is determined in step S1301 that the user steps on the pedal 105 once with a foot or the like the CPU 201 further determines a value of current Mode.

When it is determined that the value of current Mode is 0 i.e., the loop recording/playback is being not performed, the CPU 201 executes a series of processing from steps S1303 to S1308 in FIG. 13 for transition from Mode0 to Mode1. This is a state of "STEP ON PEDAL FROM Mode0" at time t0 in FIG. 16.

The CPU 201 first sets the value of the Mode variable to 1 indicating Mode1 and also sets the value 0 of Mode corresponding to one preceding Mode® for the PrevMode variable (step S1303).

Then, the CPU 201 sets a value 1 for the RecStart variable for starting loop recording in Mode1 (step S1304).

Then the CPU 201 stores a value Area1 indicating the first loop storage area 301 of FIG. 3 for a variable RecArea. (hereinafter, the value of this variable is referred to as "RecArea" that is the same as the variable name) on the RAM 203 indicative of a loop storing area in which loop recording is performed on the looper LSI 220 of FIG. 3 (step S1305).

Then the CPU 201 sets a value of −TimeDivision×Beat for the variable RecPointer indicating a storage address in a TickTime unit of loop recording and also sets a value 0 for the variable PhrasePointer (step S1306). As described in step S1203 of FIG. 12, TimeDivision Beat is the TickTime of one measure, Since the value 0 of RecPointer is a beginning storage address, the value of −TimeDivision×Beat indicates a timing of one preceding measure until storing starts. This is for delay of one measure until the value of RecPointer is caused to stat from 0 in the TickTime interrupt processing because there is a delay of one measure after the user starts a loop performance of one measure until the sound synthesis LSI 205 outputs the inferential musical sound data 217 corresponding to the loop performance.

Then the CPU 201 sets the value 0 for the PlayStart variable since the loop playback is not performed in Mode1 (step S1307)

In addition, the CPU 201 sets a value of a LoopEnd variable (hereinafter, the value of this variable is referred to as "LoopEnd" that is the same as the variable name) on the RAM 203 indicating an end of the loop recording to a sufficiently large number Max stored in the ROM 202 of FIG. 2 (step S1308).

Figure 14:
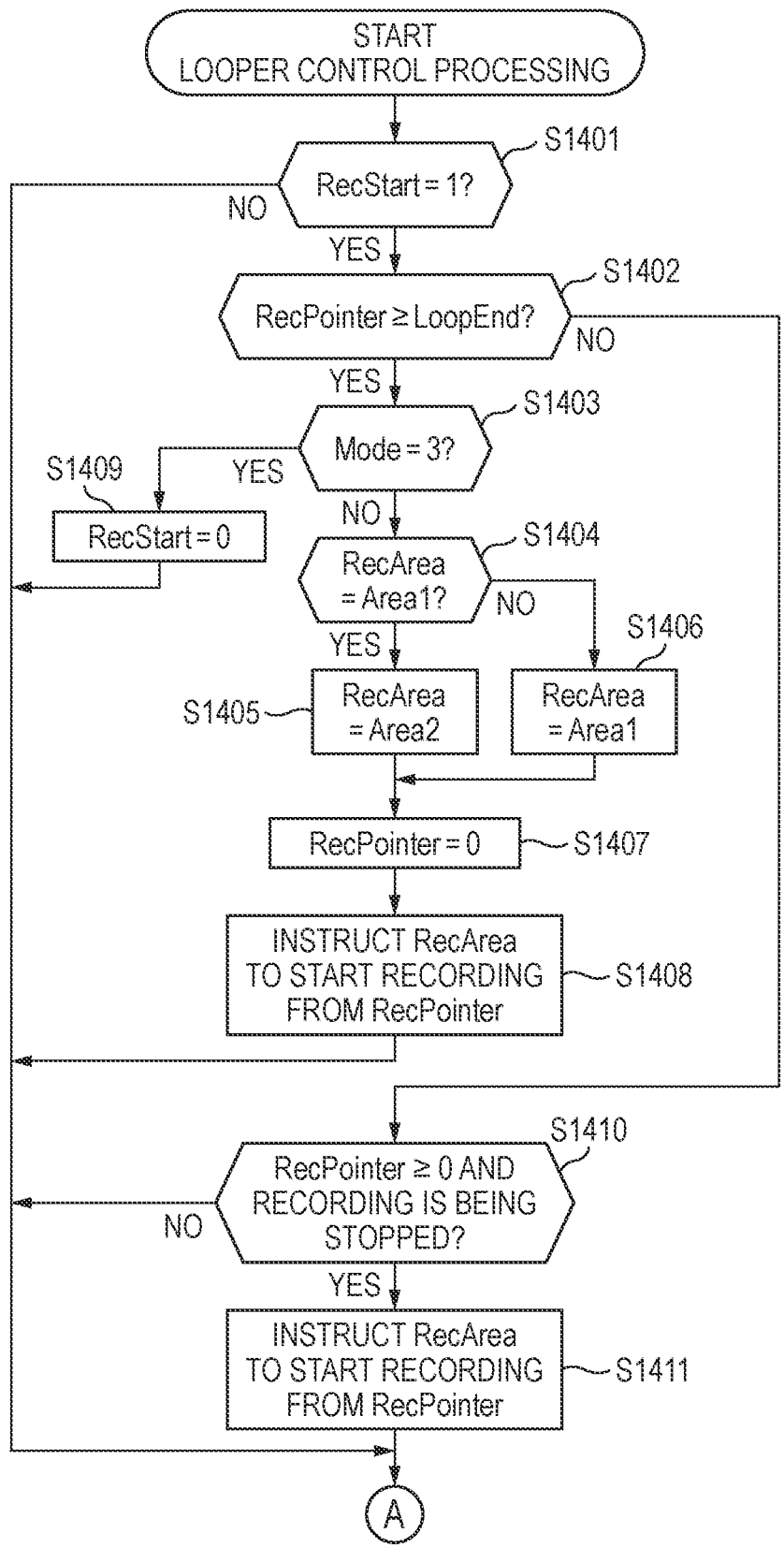
FIG. 14 is a first flowchart showing a detailed example of looper control processing.

After Mode1 is set by the user stepping on the pedal 105 once in Mode0 through the series of processing from step S1303 to step S1308 of FIG. 13 in the pedal control processing of step S1104 of FIG. 11 in the switch processing of step S902 of FIG. 9, as described above, the CPU 201 executes following processing in looper control processing of FIG. 14 corresponding to step S905 of FIG. 9.

In FIG. 14, the CPU 201 first determines whether the RecStart value is 1 (step S1401). In a case in which the state transitions from Mode0 to Mode1, the determination in step S1401 is YES because RecStart=1 has been set in step S1304 of FIG. 13.

When the determination in step S1401 is YES, the CPU 201 determines whether the RecPointer value becomes equal to or larger than the LoopEnd value (step S1402). Since the sufficiently large value is stored for the LoopEnd variable in step S1308 of FIG. 13, the determination in step S1402 is initially NO.

When the determination in step S1402 is NO, the CPU 201 determines whether the loop recording is currently stopped and the RecPointer value becomes equal to or larger than 0 (step S1410).

In step S1306 of FIG. 13, for the RecPointer value, a minus value of one measure, i.e., −TimeDivision×Beat is stored. For this reason, after RecStart becomes 1 by the TickTime interrupt processing of FIG. 12, every time Tick-Time elapses, the RecPointer value is sequentially incremented by 1 from −TimeDivision×Beat (refer to step S1202 of FIG. 12). Until the TickTime of one measure elapses and the RecPointer value becomes 0, the determination in step S1410 of FIG. 14 continues to be NO, and the determination in following step S1412 of FIG. 15 as to whether the PlayStart value is 1 also continues to be NO (refer to step S1307 of FIG. 13). Accordingly, nothing is executed substantially in the looper control processing of FIG. 14, and only time elapses.

When the TickTime of one measure elapses at last and the RecPointer value becomes 0, the CPU 201 causes the loop recording unit 303 of FIG. 3 in the looper LSI 220 of FIG. 2 to start a loop recording operation from a beginning address 0 indicated by the variable RecPointer for the first loop storage area 301 of FIG. 3 corresponding to the value Area1 indicated by the variable RecArea (step S1411).

In the operation illustration of FIG. 16, at time t0, the state transitions from Mode0 to Mode1 as the user steps on the pedal 105. In conformity to this, the user starts a loop performance by key pressing of designating a pitch sequence of each measure on the keyboard 101 of FIG. 1, as shown at time t0 in (a) of FIG. 16. As for the loop performance after time t0 shown in (a) of FIG. 16, the key pressing designation is transmitted from the keyboard 101 to the sound module LSI 204 via the key scanner 206 and the CPU 201, so that the corresponding musical sound output data 218 is output from the sound module LSI 204 and the corresponding musical sound is emitted from the speaker (not shown) via the mixer 213, the digital-to-analog converter 211, and the amplifier 214.

Thereafter, as time elapses, the inferential musical sound data 217 corresponding to the first measure starts to be output from the sound synthesis LSI 205, at time t1 after the TickTime of one measure elapses from time t0, as shown in (b) of FIG. 16. In synchronization with this, the loop recording of the inferential musical sound data 217 after measure 1, which is sequentially output from the sound synthesis LSI 205, into the first loop storage area 301 (Area1) is started after time t1, as shown in (c) of FIG. 16 by the processing of step S1411. At this time, as for the performance input from measure 1 to measure 4, for example, shown at the timing in (a) of FIG. 16, the output timing of the inferential musical sound data 217 from the sound synthesis LSI 205 and the loop recording timing into the first loop storage area 301 are delayed by one measure, as shown in (b) and (c) of FIG. 16. This is due to a constraint that the sound synthesis LSI 205 outputs the inferential musical sound data 217 with a delay of one measure with respect to the note sequence of each measure that is input as the pitch data 215. Since the inferential musical sound data 217 delayed by one measure with respect to the user's key pressing performance is input to the looper LSI 220 but is not output to the mixer 213, the corresponding sound production is not performed.

After the loop recording from measure 1 is started at time t1 until the value of RecPointer reaches LoopEnd to be described later, the control of the YES determination in step S1401->the NO determination in step S1402 the NO determination in step S1410 is repeated in the looper control processing of FIG. 14 by the CPU 201. Thereby, the loop recording unit 303 of FIG. 3 in the looper LSI 220 of FIG. 2 continues the loop recording started from RecPointer=0 (beginning address) into the first loop storage area 301 of FIG. 3 indicated by RecArea=Area1 in step S1411 of FIG. 14 at time t1. The loop recording unit 303 sequentially loop-records the inferential musical sound data 217 from measure 1 to measure 4 that is output from the sound synthesis LSI 205 of FIG. 2 from time t1 in (b) of FIG. 16 to time t5 to be described later as shown in (c) of FIG. 16.

Then it is assumed that the user steps on the pedal 105 at time t4, the end of measure 4, during the loop performance shown in (a) of FIG. 16. As a result, in the pedal control processing of FIG. 13 corresponding to step S1104 of FIG. 11 in the switch processing of step S902 of FIG. 9, it is determined as "STEPPED ONCE" in step S1301 and in step S1302 that the current Mode is Mode=1, so that the CPU 201 executes a series of processing from steps S1309 to S1314 for transition from Mode1 to Mode2.

The CPU 201 first sets the value of the Mode variable to 2 indicating Mode2 and also sets the value 1 of Mode corresponding to one preceding Mode1 for the variable PrevMode (step S1309).

Then the CPU 201 sets, for the LoopEnd variable indicating the end of the loop recording, a value obtained by adding a value TimeDivision×Beat indicating the TickTime of one measure to the current RecPointer value (step S1310). In the example of FIG. 16, the RecPointer value indicates time t4. However, as shown in (b) and (c) of FIG. 16, as the output timing of the inferential musical sound data 217 and the timing of the loop recording, time t4 indicates the end of measure 3 and is delayed by one measure with respect to the end of measure 4 in (a) of FIG. 16. Therefore, in order to proceed with the loop recording up to time t5 delayed by one measure with respect to the current RecPointer value and to complete the recording up to the end of measure 4, a value obtained by adding a value TimeDivision×Beat indicating the TickTime of one measure to the current RecPointer value is set for the LoopEnd variable indicating the end of the loop recording. That is, the LoopEnd value has TickTime of four measures.

Subsequently, the CPU 201 sets the value 1 for the variable PlayStart so as to validate the loop playback for overdubbing by Mode2 (step S1311).

In addition, the CPU 201 sets the beginning address 0 for the PlayPointer variable indicating an address of loop playback (step S1312) on a TickTime basis.

Further, the CPU 201 sets the value Area1 indicating the first loop storage area 301 for which the loop recording has been performed so far, for the variable PlayArea, which indicates a loop storage area for loop playback, of the first loop storage area 301 and the second loop storage area 302 shown in FIG. 3 (step S1313).

Then the CPU 201 causes the loop playback unit 304 of FIG. 3 in the looper LSI 220 of FIG. 2 to start a loop playback operation from the beginning address 0 indicated by the variable PlayPointer for the first loop storage area 301 of FIG. 3 corresponding to the value Area1 indicated by the variable PlayArea (step S1314).

In the operation illustration of FIG. 16, at time t4, the user steps on the pedal 105, so that the state transitions from Mode1 to Mode2. As shown at time t4 in (d) of FIG. 16, the user again starts the key pressing performance of designating the pitch sequence of each measure from the measure 1 with superimposing the loop-playback sound 310 from the beginning address (the first measure) of the first loop storage area 301 in the looper LSI 220 of FIG. 2, for which the loop-recording has been performed so far, and the loop-playback sound that the loop-playback sound 310 is emitted as the loop-playback inferential musical sound data. 222 from the speaker (not shown) via the digital-to-analog converter 211 and the amplifier 214 from the mixer 213, as shown at time t4 in (e) of FIG. 16. As for the loop performance after time t4 shown in (d) of FIG. 16, the key pressing designation is transmitted from the keyboard 101 to the sound module LSI 204 via the key scanner 206 and the CPU 201, so that the corresponding musical sound output data 218 is output from the sound module LSI 204 and the corresponding musical sound is emitted from the speaker (not shown) via the mixer 213, the digital-to-analog converter 211, and the amplifier 214. In synchronization with this, as described above, the loop-playback inferential musical sound data 222 output from the looper LSI 220 is also mixed with the musical sound output data 218 by the user's loop performance in the mixer 213, which is then emitted. In this way, the user can perform the loop performance by pressing the keys of the keyboard 101 while listening to the loop-playback inferential musical sound data 222 from the looper LSI 220 recorded immediately before.

Note that, as described above with respect to step S1310 of FIG. 13, the value corresponding to time t5 is set for the variable LoopEnd. Therefore, in the looper control processing of FIG. 14 corresponding to step S905 of FIG. 9, after time t4 until the value of RecPointer that is sequentially incremented every TickTime by step S1202 of the TickTime interrupt processing of FIG. 12 reaches time t5, the determination in step S1401 becomes YES, the determination in step S1402 becomes NO, and the determination in step S1410 becomes NO, so that the CPU 201 proceeds with the input of the inferential musical sound data 217 of measure 4 from the sound synthesis LSI 205 into the looper LSI 220, as shown in (b) of FIG. 16, and the loop recording (started in step S1411) of the inferential musical sound data 217 of measure 4 into the first loop storage area 301 (Area1), as shown in (c) of FIG. 16.

Thereafter, when the value of RecPointer that is sequentially incremented every TickTime by step S1202 of the TickTime interrupt processing of FIG. 12 reaches time t5, the determination in step S1401 becomes YES and the determination in step S1402 also becomes YES. In addition, since the current mode is Mode=1, the determination in step S1403 becomes NO. As a result, the CPU 201 first determines whether the value set for the variable RecArea is Area1 indicating the first loop storage area 301 of FIG. 3, i.e., whether the value is Area2 indicating the second loop storage area 302 of FIG. 3 (step S1404). When the determination in step S1404 is YES (RecArea=Area1), the CPU 201 changes the value of the variable RecArea to Area1 (step S1405). On the other hand, when the determination in step S1404 is NO (RecArea T Area1, i.e., RecArea=Area2), the CPU 201 changes the value of the variable RecArea to Area1 (step S1406). In the operation example of FIG. 16, at time t5, the value of RecArea is Area1 as shown in (c) of FIG. 16, and the first loop storage area 301 of FIG. 3 is set as the target storage area of the loop recording. However, after time t5, the value of RecArea becomes Area1 as shown in (h) of FIG. 16, so that the second loop storage area 302 of FIG. 3 newly becomes a target storage area of the loop recording.

Thereafter, the CPU 201 sets the value of RecPointer to the beginning address 0 (step S1407).

Then the CPU 201 causes the loop recording unit 303 of FIG. 3 in the looper LSI 220 of FIG. 2 to start a loop recording operation from the beginning address 0 indicated by the variable RecPointer into the second loop storage area 302 of FIG. 3 corresponding to the value Area1 indicated by the variable RecArea (step S1408). In the operation example of FIG. 16, this corresponds to time t5 and thereafter in (h) of FIG. 16.

Figure 15:
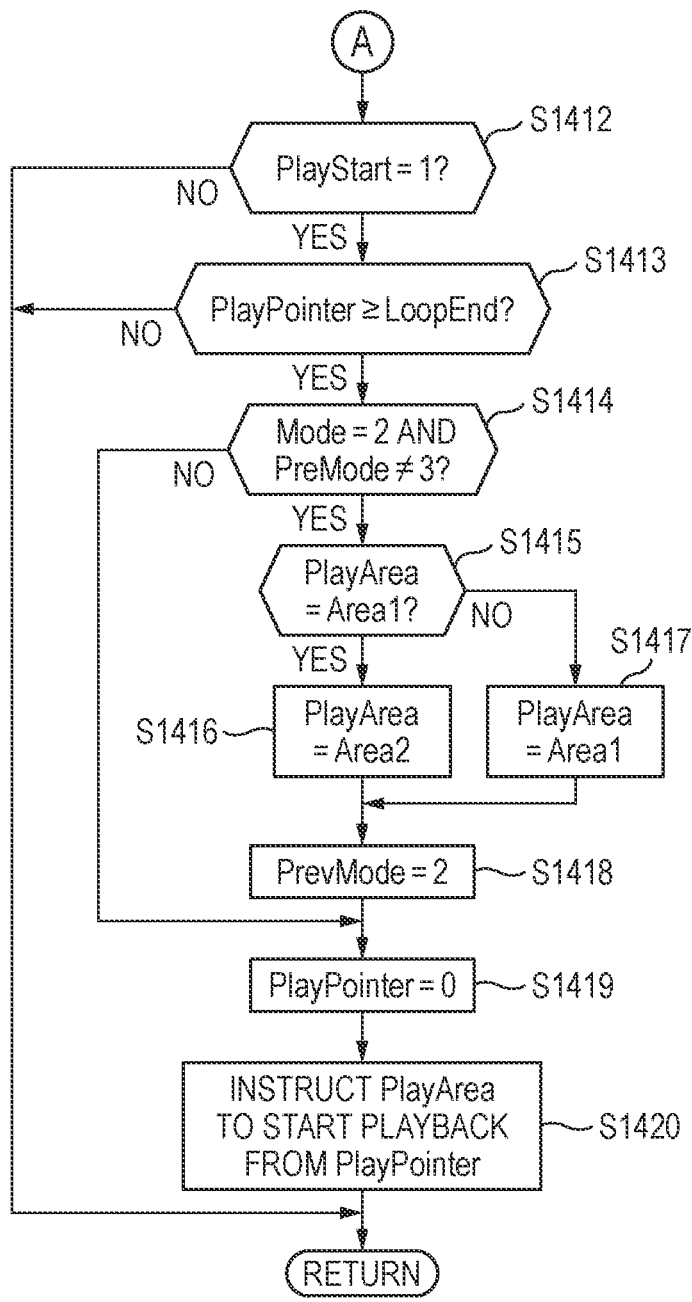
FIG. 15 is a second flowchart showing the detailed example of the looper control processing.

Then, in step S1412 of FIG. 15 that is executed after step S1408 of FIG. 14, the CPU 201 determines whether the value of the variable PlayStart is 1. At the time t4 in FIG. 16, since the value of the variable PlayStart is set to 1 by step S1311, the determination in step S1412 becomes YES.

Subsequently, the CPU 201 determines whether the value of the variable PlayPointer becomes equal to or larger than the value of the variable LoopEnd (step S1413). However, at the time t4, since the value of the variable PlayPointer is still 0 (refer to step S1312 of FIG. 13), the determination in step S1413 becomes NO. As a result, the CPU 201 ends the looper control processing of step S905 of FIG. 9 shown in the flowcharts of FIGS. 14 and 15.

In this way, after the loop playback from measure 1 is started at time t4 until the value of PlayPointer reaches LoopEnd, the looper control of the YES determination in step S1412 the NO determination in step S1413 is repeated in the looper control processing of FIG. 15 by the CPU 201. Thereby, the loop playback unit 304 of FIG. 3 in the looper LSI 220 of FIG. 2 continues the loop playback started from PlayPointer=0 (beginning address) from the first loop storage area 301 of FIG. 3 indicated by PiayArea=Area1 in step S1314 of FIG. 13 at time t4 in (e) of FIG. 16. Then the loop playback unit 304 sequentially plays back the loop-playback sound 310 from measure 1 to measure 4 from time t4 to time t8 to be described later in (e) of FIG. 16 and emits it from the speaker.

At this time, the user continues the loop performance of each measure from measure 1 to measure 4 by pressing the keys of the keyboard 101 of FIG. 1, as shown in (d) of FIG. 16, in conformity to the loop playback sound from measure 1 to measure 4 emitted from the speaker from time t4 to time t8 to be described later, so that the musical sound output data 218 corresponding to the performance designation is emitted from the sound module LSI 204.

As a result, the pitch sequence and the musical instrument of each measure from measure 1 to measure 4 are input on a measure basis into the sound synthesis LSI 205 by step S1204 of FIG. 12. As a result, the sound synthesis LSI 205 outputs the inferential musical sound data 217, to which rich musical expression has been added, to the looper LSI 220 of FIG. 2, with a delay of one measure, in a loop section from time t5 to time t9 to be described later in (f) of FIG. 16.

On the other hand, the loop-playback sound 310 of FIG. 3 that is loop-played back from time t4 to time t8 to be described later in (e) of FIG. 16 is delayed by one phrase by the phrase delay unit 305 of FIG. 3, so that the loop-playback sound delay output 311 is input into the mixer 307 from time t5 to time t9 to be described later, as shown in (g) of FIG. 16. It can be seen that the inferential musical sound data 217 input into the mixer 307 from time t5 to time t9 as shown in (f) of FIG. 16 and the loop-playback sound delay output 311 input into the mixer 307 from time t5 to time t9 as shown in (g) of FIG. 16 have the same timing from measure 1 to measure 4. Therefore, the mixer 307 mixes and inputs the inferential musical sound data 217 and the loop-playback sound delay output 311 into the loop recording unit 303 of FIG. 3. As a result, the loop recording unit 303 performs sequential overdubbing of the mixing data from measure 1 at time t5 to measure 4 at time t9 into the second loop storage area 302 of FIG. 3 indicated by RecArea=Area2. Note that, it is assumed that the operation of the phrase delay unit 305 is synchronized with the value of TimeDivision×Beat.

Here, it is assumed that the loop-playback sound 310 shown in (e) of FIG. 16 reaches the end of measure 4, i.e., time t8 corresponding to the end of the loop section. In this case, in the looper control processing of FIGS. 14 and 15 corresponding to step S905 of FIG. 9, after the determination in step S1412 of FIG. 15 becomes YES, since the value of PlayPointer has reached the value of LoopEnd, the determination in step S1413 becomes YES. In addition, since Mode value=2 and PrevMode value=1 (refer to step S1309 of FIG. 13), the determination in step S1414 becomes YES. As a result, the CPU 201 first determines whether the value set for the variable PlayArea is Area1 indicating the first loop storage area 301 of FIG. 3, whether the value is Area2 indicating the second loop storage area 302 of FIG. 3 (step S1415). When the determination in step S1415 is YES (PlayArea=Area1), the CPU 201 changes the value of the variable PlayArea to Area2 (step S1416). On the other hand, when the determination in step S1415 is NO (PlayArea Area1, i.e., PlayArea=Area2), the CPU 201 changes the value of the variable PlayArea to Area1 (step S1417). In the operation example of FIG. 16, at time t8, the value of PlayArea is Area1 as shown in (e) of FIG. 16, and the first loop storage area 301 of FIG. 3 is set as the target storage area of the loop playback. However, after time t8, the value of PlayArea becomes Area1, so that the second loop storage area 302 of FIG. 3 newly becomes a target storage area of the loop reproduction, as shown in) (j) of FIG. 16.

Thereafter, the CPU 201 sets the value of the variable PrevMode to 2 (step S1418).

In addition, the CPU 201 sets the value of the variable PlayPointer to the beginning address 0 (step S1419).

Then the CPU 201 causes the loop playback unit 304 of FIG. 3 in the looper LSI 220 of FIG. 2 to start a loop playback operation from the beginning address 0 indicated by the variable PlayPointer for the second loop storage area 302 of FIG. 3 corresponding to the value Area1 indicated by the variable PlayArea (step S1420). In the operation example of FIG. 16, this corresponds to time t8 and thereafter in (j) of FIG. 16.

On the other hand, the loop recording shown in (h) of FIG. 16 reaches the end of the loop section at time t9 corresponding to the end of measure 4. In this case, in the looper control processing of FIGS. 14 and 15 corresponding to step S905 of FIG. 9, after the determination in step S1401 of FIG. 14 becomes YES, since the value of RecPointer has reached the value of LoopEnd, the determination in step S1402 becomes YES. In addition, since Mode value=2, the determination in step S1403 becomes NO. As a result, the CPU 201 executes processing of exchanging the loop storage area for which the loop recording is performed, from step S1404 to step S1406. As a result, in the operation example of FIG. 16, at time t9, the value of RecArea is Area1 as shown in (h) of FIG. 16 and the second loop storage area 302 of FIG. 3 is set as the target storage area of the loop recording. However, after time t9, the value of RecArea becomes Area1, so that the first loop storage area 301 of FIG. 3 newly becomes a target storage area of the loop recording, as shown in (m) of FIG. 16.

Thereafter, the CPU 201 sets the value of RecPointer to 0 (step S1407),

Then the CPU 201 causes the loop recording unit 303 of FIG. 3 in the looper LSI 220 of FIG. 2 to start a loop recording operation from the beginning address 0 indicated by the variable RecPointer into the first loop storage area 301 of FIG. 3 corresponding to the value Area1 indicated by the variable RecArea (step S1408). In the operation example of FIG. 16, this corresponds to time t9 and thereafter in (m) of FIG. 16.

As described above, in Mode=2, when the loop playback and the overdubbing synchronized therewith reach the end of the loop section, the loop storage area for which loop recording has been performed so far and the loop storage area for which loop playback has been performed so far are exchanged between the first loop storage area 301 and the second loop storage area 302, so that the overdubbing proceeds. Thereby, the user can generate the loop-playback sound 310 of the loop section while sequentially overdubbing the inferential musical sound data 217 obtained based on the user's performance to the loop-playback sound 310 of the loop section.

It is assumed that during the loop performance in (i) of FIG. 16 and (i) of FIG. 17, for example, in Mode=2, the user steps on the pedal 105 at any timing, for example, at time t12, the end of measure 4. As a result, in the pedal control processing of FIG. 13 corresponding to step S1104 of FIG. 11 in the switch processing of step S902 of FIG. 9, it is determined as "STEPPED ONCE" in step S1.301 and in step S1302 that the current Mode is Mode=2, so that the CPU 201 executes a series of processing from step S1315 to step S1321 of FIG. 13 for transition from Mode2 to Mode3.

The CPU 201 first sets the value of the Mode variable to 3 indicating Mode3 and also sets the value 2 of Mode corresponding to one preceding Mode2 for the variable PrevMode (step S1315).

Then the CPU 201 sets the beginning address 0 for the PlayPointer variable indicating an address of loop playback on a TickTime basis (step S1316).

Subsequently, the CPU 201 executes processing of exchanging the loop storage areas for which the loop playback is performed, from step S1317 to step S1319 of FIG. 13 similar to the series of processing of from step S1415 to step S1417 of FIG. 15. As a result, in the operation example of FIGS. 16 and 17, at, time 112, the value of PlayArea is Area2 as shown in (j) of FIG. 17 and the second loop storage area 302 of FIG. 3 is set as the target storage area of the loop recording but, after time t12, the value of PlayArea becomes Area1, so that the first loop storage area 301 of FIG. 3, which has been a target of the overdubbing so far, newly becomes a target storage area of the loop playback, as shown in (n) of FIG. 17.

Then the CPU 201 sets, for the LoopEnd variable indicating the end of the loop recording, a value obtained by adding the value TimeDivision×Beat indicating the TickTime of one measure to the current RecPointer value (step S1320). In the example of FIG. 17, the RecPointer value indicates time t12. However, as shown in (m) of FIG. 17, as the timing of the loop recording, time t12 indicates the end of measure 3 and is delayed by one measure with respect to the end of measure 4 shown in (i) of FIG. 16. Therefore, in order to proceed with the loop recording up to time t13 delayed by one measure with respect to the current RecPointer value and to complete the recording up to the end of measure 4, a value obtained by adding a value TimeDivision×Beat indicating the TickTime of one measure to the current RecPointer value is set for the LoopEnd variable indicating the end of the loop recording.

Then the CPU 201 causes the loop playback unit 304 of FIG. 3 in the looper LSI 220 of FIG. 2 to start a loop playback operation from the beginning address 0 indicated by the variable PlayPointer for the first loop storage area 301 of FIG. 3 corresponding to the value Area1 indicated by the variable PlayArea (step S1321).

In step S1412 of FIG. 15, the CPU 201 determines whether the value of the variable PlayStart is 1. At time 112 in the operation example of FIG. 17, since the value of the variable PlayStart has been continuously set to 1 from Mode2, the determination in step S1412 becomes YES.

Subsequently, the CPU 201 determines whether the value of the variable PlayPointer becomes equal to or larger than the value of the variable LoopEnd (step S1413). However, at time t12, since the value of the variable PlayPointer is 0 (refer to step S1316 of FIG. 13), the determination in step S1413 becomes NO. As a result, the CPU 201 ends the looper control processing of step S905 of FIG. 9 shown in the flowcharts of FIGS. 14 and 15.

In this way, as shown in (n) of FIG. 17, after the loop playback from measure 1 is started at time t12 until the value of PlayPointer reaches LoopEnd, the looper control of the YES determination in step S1412->the NO determination in step S1413 is repeated in the looper control processing of FIG. 15 by the CPU 201. Thereby, the loop playback unit 304 of FIG. 3 in the looper LSI 220 of FIG. 2 continues the loop playback started from PlayPointer=0 (beginning address) from the first loop storage area 301 of FIG. 3 indicated by PlayArea Area1 in step S1321 of FIG. 13 at time t12 in (n) of FIG. 17. Then the loop playback unit 304 sequentially plays back the loop-playback sound 310 from measure 1 to measure 4 from time t12 to time t16 to be described later in (n) of FIG. 17 and emits it from the speaker.

At this time, the user can, for example, freely enjoy performance, in conformity to the loop-playback sound from measure 1 to measure 4, which is emitted from the speaker from time t12 to time t16 to be described later in (n) of FIG. 17, and the musical sound output data 218 is generated in the sound module LSI 204 of FIG. 2 by the key pressing performance on the keyboard 101. The musical sound output data 218 is mixed with the loop-playback sound 310 in the mixer 213, which is emitted from the speaker (not shown) via the digital-to-analog converter 211 and the amplifier 214.

As described above with respect to step S1310 of FIG. 13, the value corresponding to time t13 is set for the variable LoopEnd. Therefore, in the looper control processing of FIG. 14 corresponding to step S905 of FIG. 9, after time t12 until the value of RecPointer that is sequentially incremented every TickTime by step S1202 of the TickTime interrupt processing of FIG. 12 reaches time t13, the determination in step S1401 becomes YES, the determination in step S1402 becomes NO, and the determination in step S1410 becomes NO, so that the CPU 201 proceeds with the input of the inferential musical sound data 217 of measure 4 from the sound synthesis LSI 205 into the looper LSI 220, as shown in (k) of FIG. 16, the input of the loop-playback sound delay output 311, as shown in (l) of FIG. 16, and the loop recording of the inferential musical sound data 217 of measure 4 into the first loop storage area 301 (Area1), as shown in (m) of FIG. 16.

Thereafter, when the value of RecPointer sequentially incremented every TickTime by step S1202 of the TickTime interrupt processing of FIG. 12 reaches time 113, the determination in step S1401 becomes YES, and the determination in step S1402 also becomes YES. In addition, since the current mode is Mode=3, the determination in step S1403 becomes YES. As a result, the CPU 201 sets a value 0 for the RecStart variable for stopping the loop recording (step S1409). Thereafter, the CPU 201 shifts to step S1.412 of FIG. 15.

Thereby, the ending of the loop recording considering the delay of one phrase, and the loop recording are performed (the YES determination in step S1412 the YES determination in step S1413->the NO determination in step S1414->S1419->S1420). As a result, as shown in (p) of FIG. 17, after the loop playback is performed up to time t20, the end of the loop section, the mode shifts to Mode3 in which the loop playback from the first loop storage area 301, for which the loop playback has been performed so far, is performed, from time t20, as shown in (t) of FIG. 17.

It is assumed that, although not shown in (n) of FIG. 17, the loop-playback sound 310 shown in (n) of FIG. 17 reaches the end of measure 4, i.e., time t16 corresponding to the end of the loop section. Although different from the case of (n) of FIG. 17, if the user does steps on the pedal, in the looper control processing of FIGS. 14 and 15 corresponding to step S905 of FIG. 9 after the determination in step S1412 of FIG. 15 becomes YES, since the value of PlayPointer has reached the value of LoopEnd, the determination in step S1413 becomes YES. In addition, since Mode value=3, the determination in step S1414 becomes NO. As a result, the CPU 201 jumps to step S1419 and resets the value of PlayPointer to the beginning address 0 (step S1419).

Then the CPU 201 causes the loop playback unit 304 of FIG. 3 in the looper LSI 220 of FIG. 2 to repeat the loop playback operation from the beginning address 0 indicated by the variable PlayPointer for the first loop storage area 301 of FIG. 3 corresponding to the value Area1 indicated by the variable PlayArea (step S1420). The loop playback from the first loop storage area 301 similar to time t12 to time t16 in (n) of FIG. 16 is repeated endlessly.

Then, it is assumed that the user steps on the pedal 105 at time t16, the end of measure 4, for example, during the loop playback by Mode3 shown in (n) of FIG. 17. As a result, in the pedal control processing of FIG. 13 corresponding to step S1104 of FIG. 11 in the switch processing of step S902 of FIG. 9, it is determined as "STEPPED ONCE" in step S1301 and in step S1302 that the current Mode is Mode=3, so that the CPU 201 executes a series of processing from step S1322 to step S1323 of FIG. 13 for return transition from Mode3 to Mode2.

The CPU 201 first sets the value of the Mode variable to 2 indicating Mode2 and also sets the value 3 of Mode corresponding to one preceding Mode3 for the variable PrevMode (step S1322).

Then the CPU 201 sets the value 1 for the RecStart variable for starting loop recording in Mode2 (step S1323).

Then the CPU 201 determines whether the value set for the variable PlayArea is Area1 indicating the first loop storage area 301 of FIG. 3, i.e., whether the value is Area1 indicating the second loop storage area 302 of 1G. 3 (step S1324). When the determination in step S1324 is YES (PlayArea=Area1), i.e., the loading source of the loop-playback sound 310, which has been played back so far in Mode3, is the first loop storage area 301, in order to use it as the loop-playback sound 310 as it is, also in next Mode2, and to set the loop storage area for loop recording to the second loop storage area 302, the value Area2 indicating the second loop storage area 302 of FIG. 3 is stored in the variable RecArea indicating the loop storage area for loop recording (step S1325). On the other hand, when the determination in step S1324 is NO (PlayArea≠Area1), i.e., the loading source of the loop-playback sound 310, which has been played back so far in Mode3, is the second loop storage area 302, in order to use it as the loop-playback sound 310 as it is, also in next Mode2, and to set the loop storage area for loop recording to the first loop storage area 301, the value Area1 indicating the first loop storage area 301 of FIG. 3 is stored in the variable RecArea indicating of the loop storage area for loop recording (step S1326).

Then the CPU 201 sets a value of −TimeDivision×Beat for the variable RecPointer indicating a storage address in a TickTime unit of loop recording and also sets a value 0 for the variable PhrasePointer (step S132). This processing is the same as the processing of step S1306 in Mode1.

The operation example at time t16 and thereafter in (o), (p), (q), (r), and (s) of FIG. 17 after transition processing from Mode3 to Mode2 is similar to that at time t4 and thereafter in (d), (e), (f), (g), and (h) of FIG. 16.

Then, it is assumed that the user holds the pedal 105 at time t19 when the user has performed up to measure 2, for example, during the overdubbing by Mode2 shown in (o), (p), (q), (r), and (s) of FIG. 17. As a result, in the pedal control processing of FIG. 13 corresponding to step S1104 of FIG. 11 in the switch processing of step S902 of FIG. 9, it is determined as "HOLD" in step S1301, so that the CPU 201 executes processing for transitioning to Mode3 in which only the last recording in the overdubbing is canceled and previous one is played back.

That is, the CPU 201 first sets the value of the Mode variable to 3 (step S1327).

Then the CPU 201 sets a value 0 for the RecStart variable (step S1328),

By the above processing, in the looper control processing of FIG. 14, the determination in step S1401 becomes NO, so that the CPU 201 immediately (at time t19) stops the loop recording operation. In addition, after waiting for the PlayPointer value to reach LoopEnd, the CPU 201 leaves the loop storage area for which the loop playback is currently performed, returns the PlayPointer value to 0 and repeats the loop playback from the beginning (the YES determination in step S1412 of FIG. 15->the YES determination in step S1413->the NO determination in step S1414 S1419->S1420). As a result, in the operation of Mode2, after the overdubbing shown in (q), (r), and (s) of FIG. 17 is canceled immediately at time t19, and the loop playback shown in (p) of FIG. 17 is executed up to t20, the end of the loop section, the same loop-playback sound 310 can be repeatedly played back from time t20 by Mode3. Thereafter, the user can shift to Mode 2 and proceed with the overdubbing by stepping on the pedal 105 again, for example.

Finally, the user can stop the loop operation by stepping on the pedal 105 twice at any timing. As a result, in the pedal control processing of FIG. 13 corresponding to step S1104 of FIG. 11 in the switch processing of step S902 of FIG. 9, it is determined as "STEPPED TWICE" in step S1301, so that the CPU 201 first resets the Mode value to 0 (step S1329) and then resets all of the RecStart value and the PlayStart value to 0 (step S1330). As a result, in the looper control processing of FIGS. 14 and 15, the determinations in step S1401 and step S1412 become all NO, so that the CPU 201 stops the loop control.

In general, it is difficult to play a musical instrument simultaneously with loop recording/playback operation. In the above embodiment, however, by repeating recording/playback operation with playing a simple phrase, a loop recording/playback performance with rich musical expression based on the inferential musical sound data 217 can be obtained easily.

As an embodiment using the inferential musical sound data 217 output from the sound synthesis LSI 205, an embodiment has been described in which the inferential musical sound data 217 is used for the loop recording/playback by the looper LSI 220 shown in FIG. 2, As another embodiment using the inferential musical sound data 217 output from the sound synthesis LSI 205, an embodiment is also conceivable in which the output of the inferential musical sound data 217 of a phrase is recorded automatically together with automatic accompaniment or rhythm to enjoy automatic performance. Accordingly, the user can enjoy the automatic performance with a monotonous phrase performance converted into a musically expressive performance.

In addition, according to various embodiments implementable by the present invention, by converting a performance phrase of the musical instrument sound by the user into a performance phrase of the musical instrument sound by a professional player, the converted musical instrument sound can be output, and the loop performance can be performed based on the output of the musical instrument sound.

According to the first embodiment of the statistical sound synthesis processing using the HMM acoustic model described with reference to FIGS. 6 and 7, it is possible to reproduce exquisite musical expression of a phrase performance characteristic of a specific player, a specific style, or the like with smoothness in musical instrument sound without splice distortion. In addition, by altering the training result 615 (model parameters), it is possible to adapt to other player and to express various phrase performances. Further, since all the model parameters in the HMM acoustic model can be automatically estimated from the training score data set 611 and the training performance data set 612, by learning characteristics of a specific player using the HMM acoustic model, it is possible to automatically establish a musical instrument performance system to synthesize a sound reproducing the characteristics. Since a fundamental frequency and duration of musical instrument sound output are dependent on a phrase in a score, pitch change over time and temporal structure of rhythm can be simply determined from the score. A musical instrument sound synthesized in that way is, however, prone to be monotonous or mechanical and less attractive as a musical instrument sound. In an actual performance, a style characteristic of a player or a musical instrument is observable, for example, in pitch or note-on timing of a note, an accent on a beat, and change in temporal structure thereof, apart from a standardized performance based on the score, According to the first embodiment of the statistical sound synthesis processing using the HMM acoustic model, since change over time of the spectrum data of the musical instrument performance sound and of the pitch data, which is the sound source data, can be modeled with context, it is possible to reproduce a musical instrument sound closer to an actual phrase performance. The HMM acoustic model used in the first embodiment of the statistical sound synthesis processing is a generation model expressing how the acoustic feature sequence of the musical instrument sound relating to vibration or resonance characteristics and the like of the musical instrument changes over time during playing of a phrase. Further, according to the first embodiment of the statistical sound synthesis processing, by using the HMM acoustic model that takes context of "deviation" between a note and a musical instrument sound into consideration, musical instrument sound synthesis capable of accurately reproducing a performance that changes according to player's performance technique in a complicated manner can be achieved. By combining the first embodiment of the statistical sound synthesis processing using such HAM acoustic model with, for example, the real-time phrase performance on the keyboard 100, it is possible to reproduce phrase performance technique of a modeled player, which was impossible so far, to achieve a phrase performance as if the player actually played it along a keyboard performance on the electronic keyboard instrument 100.

In the second embodiment of the statistical sound synthesis processing using the DNN acoustic model described with reference to FIGS. 6 and 8, as the expression of the relationship between the musical instrument sound feature sequence and the acoustic feature sequence, the DNN replaces the HMM acoustic model that is dependent on context based on the decision tree in the first embodiment of the statistical sound synthesis processing. In this way, it is possible to express the relationship between the musical instrument sound feature sequence and the acoustic feature amount sequence by a non-linear transformation function that is so complicated to be expressed using the decision tree. In addition, since training data is classified according to the decision tree in the HIM acoustic model that is dependent on context based on the decision tree, training data to be allocated to an HMM acoustic model dependent on each context is limited. In contrast, in the DNN acoustic model, a single DNN learns from entire training data, thereby the training data being used efficiently. For this reason, the DNN acoustic model can predict the acoustic feature sequence more accurately than the HMM acoustic model does, thereby considerably improving naturalness of the musical instrument sound to be synthesized. Further, according to the DNN acoustic model, it is possible to use the musical instrument sound feature sequence relating to a frame. Specifically, since the temporal correspondence between the acoustic feature sequence and the musical instrument sound feature sequence is predetermined in the MN acoustic model, it is possible to use the musical instrument sound features relating to the frame such as "the number of frames corresponding to duration of the current note," "the position of the current frame in the note," and the like, which are difficult to be taken into consideration in the MAI acoustic model. In this way, by using the musical instrument features relating to a frame, more precise modeling of features can be achieved to improve naturalness of the musical instrument sound to be synthesized. By combining the second embodiment of the statistical sound synthesis processing using such DNN acoustic model with, for example, the real-time performance on the keyboard 100, it is possible to approximate a performance with a musical instrument sound based on a keyboard performance and the like to performance technique of a modeled player in a more natural manner.

Although the present invention has been applied to the electronic keyboard instrument in the embodiments above, it can be applied to another electronic musical instrument such as an electronic string instrument and an electronic wind instrument.

In addition, a looper device itself can be an embodiment of an electronic musical instrument. In this case, by user's simple operation to the looper device of the embodiment that specifies pitch of a phrase and designates musical instrument, a loop recording/playback performance can be achieved as if a professional player plays it.

Sound synthesis in the sound model unit 608 of FIG. 6 is not limited to cepstrum sound synthesis. Another kind of sound synthesis such as LSP sound synthesis can be adopted.

Although statistical sound synthesis processing of the first embodiment using the HMM acoustic model and of the second embodiment using the DNN acoustic model has been described as the embodiments above, the present invention is not limited thereto. Any kind of statistical sound synthesis processing such as an acoustic model in which an HMM and a DNN are combined can be adopted.

Although a phrase consisting of pitch sequence and a musical instrument is given in real time in the embodiments above, it may be given as a part of automatic performance data.

The present application is based on Japanese Patent Application No. 2019-096779, filed on May 23, 2019, the contents of which are incorporated herein by reference.

REFERENCE SIGNS LIST

100: electronic keyboard instrument
101: keyboard (performance operators)
102: first switch panel
103: second switch panel
104: LCD
105: pedal (pedal operator)
200: control system
201: CPU
202: ROM
203: RAM
204: sound source LSI
205: sound synthesis LSI
206: key scanner
208: LCD controller
209: system bus
210: timer
211: digital-to-analog converter
213, 307: mixer
214: amplifier
215: pitch data
216: sound production control data
217: musical instrument sound output data (inferential musical sound data)
218: musical sound output data
219: network interface
220: looper LSI
221: beat data
222: loop reproduction musical instrument sound output data
301, Area1: first loop storage area
302, Area2: second loop storage area
303: loop recording unit
304: loop playback unit
305: phrase delay unit
306: beat extraction unit
310: loop-playback sound
311: loop-playback sound delay output
600: server
601: sound training unit
602: sound synthesis unit
604: training acoustic feature extraction unit
605: model training unit
606: trained acoustic model unit
608: sound model unit
609: oscillation generation unit
610: synthesis filter unit
611: training score data set
612: training musical instrument sound data set
614: training acoustic feature sequence
615: training result
617: acoustic feature sequence
618: spectrum data
619: sound source data

The invention claimed is:

1. An electronic musical instrument comprising:
a performance operator; and
at least one processor,
wherein the at least one processor:
selects a musical instrument,
in accordance with pitch data associated with the performance operator operated by a user, digitally synthesizes acoustic feature data into sound data of the selected musical instrument and outputs inferential musical sound data including an inferential performance technique of a player other than the user
that is based on the acoustic feature data which is output by a trained acoustic model obtained by performing machine learning on:
a training score data set including training pitch data; and
a training performance data set obtained by the player playing a musical instrument, as if the player plays, and
that is not played in the user operation of the performance operator.

2. The electronic musical instrument according to claim 1, wherein the inferential performance technique comprises articulation of a slur, which is a symbol in a Western music score.

3. The electronic musical instrument according to claim 1, wherein the at least one processor is configured:
to acquire, in accordance with a first user operation, first phrase data comprising a plurality of first notes from a first timing to a second timing, and
to cause first sound data that corresponds to the first phrase and includes the inferential performance technique of the player to be repeatedly output.

4. The electronic musical instrument according to claim 3, wherein the at least one processor is configured:
to acquire, in accordance with a second user operation, second phrase data comprising a plurality of second notes from a third timing to a fourth timing, and
to generate second sound data that corresponds to the second phrase and includes the inferential performance technique of the player, mix the second sound data with the first sound data, and repeatedly output the mixed first and second sound data.

5. The electronic musical instrument according to claim 4, further comprising a pedal operator, wherein the at least one processor is configured to acquire, in accordance with a user operation on the pedal operator as the first operation or the second operation, the first phrase data or the second phrase data.

6. The electronic musical instrument according to claim 4, wherein the at least one processor is configured:
to shift note-on timing of the second notes in the second phrase data to correspond with note-on timing of the first notes in the first sound data, which do not always coincide with beats, and to generate the second sound data that is shifted according to the note-on timing of the first notes in the first sound data.

7. The electronic musical instrument according to claim 6, wherein the at least one processor is configured to change duration of the second notes in the second phrase data to correspond with duration of the first notes in the first sound data, whereby duration of at least one of the second notes is changed in the second sound data.

8. A method performed by at least one processor of an electronic musical instrument, the method comprising:
    selecting, by the at least one processor, a musical instrument;
    in accordance with pitch data associated with a performance operator operated by a user, digitally synthesizing, by the at least one processor, acoustic feature data into sound data of the selected musical instrument and outputting, by the at least one processor, inferential musical sound data including an inferential performance technique of a player other than the user
    that is based on the acoustic feature data which is output by a trained acoustic model obtained by performing machine learning on:
        a training score data set including training pitch data; and
        a training performance data set obtained by the player playing a musical instrument, as if the player plays, and
    that is not played in the user operation on the performance operator.

9. The method according to claim 8, wherein the inferential performance technique comprises articulation of a slur, which is a symbol in a Western music score.

10. The method according to claim 8, further comprising:
    acquiring, in accordance with a first user operation, first phrase data comprising a plurality of first notes from a first timing to a second timing; and
    causing first sound data that corresponds to the first phrase and includes the inferential performance technique of the player to be repeatedly output.

11. The method according to claim 10, further comprising:
    acquiring, in accordance with a second user operation, second phrase data comprising a plurality of second notes from a third timing to a fourth timing; and
    generating second sound data that corresponds to the second phrase and includes the inferential performance technique of the player, mix the second sound data with the first sound data, and repeatedly output the mixed first and second sound data.

12. The method according to claim 11, further comprising acquiring, in accordance with a user operation on a pedal operator as the first user operation or the second user operation, the first phrase data or the second phrase data.

13. The method according to claim 11, further comprising:
    shifting note-on timing of the second notes in the second phrase data to correspond with note-on timing of the first notes in the first sound data, which do not always coincide with beats; and
    generating the second sound data that is shifted according to the note-on timing of the first notes in the first sound data.

14. The method according to claim 13, further comprising changing duration of the second notes in the second phrase data to correspond with duration of the first notes in the first sound data, whereby duration of at least one of the second notes is changed in the second sound data.

15. A non-transitory computer-readable storage medium having stored thereon a program executable by at least one processor in an electronic musical instrument, the program being executable to cause the at least one processor to execute:
    selecting a musical instrument;
    in accordance with pitch data associated with a performance operator operated by a user, digitally synthesizing acoustic feature data into sound data of the selected musical instrument and outputting inferential musical sound data including an inferential performance technique of a player other than the user
    that is based on the acoustic feature data output by a trained acoustic model obtained by performing machine learning on: a training score data set including training pitch data; and a training performance data set obtained by the player playing a musical instrument, as if the player plays, and
    that is not played in the user operation of the performance operator.

* * * * *